US009224302B1

(12) United States Patent
Young et al.

(10) Patent No.: US 9,224,302 B1
(45) Date of Patent: Dec. 29, 2015

(54) FOUR DIMENSIONAL FLIGHT MANAGEMENT WITH TIME CONTROL SYSTEM AND RELATED METHOD

(71) Applicants: Shih-Yih Young, Marion, IA (US); Kristen M. Jerome, Monticello, IA (US)

(72) Inventors: Shih-Yih Young, Marion, IA (US); Kristen M. Jerome, Monticello, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/725,432

(22) Filed: May 29, 2015

Related U.S. Application Data

(63) Continuation-in-part of application No. 14/283,683, filed on May 21, 2014.

(51) Int. Cl.
*G08G 5/00* (2006.01)

(52) U.S. Cl.
CPC ............ *G08G 5/0039* (2013.01); *G08G 5/0021* (2013.01); *G08G 5/0047* (2013.01); *G08G 5/0052* (2013.01); *G08G 5/0069* (2013.01); *G08G 5/0091* (2013.01)

(58) Field of Classification Search
CPC . G08G 5/0039; G08G 5/0021; G08G 5/0047; G08G 5/0052; G08G 5/0069; G08G 5/0091
See application file for complete search history.

(56) References Cited

U.S. PATENT DOCUMENTS

| | | | | | |
|---|---|---|---|---|---|
| 5,121,325 | A | * | 6/1992 | DeJonge | G05D 1/0005 244/182 |
| 8,788,189 | B2 | * | 7/2014 | Polansky | G08G 5/003 701/121 |
| 8,862,287 | B1 | * | 10/2014 | Clark | G01C 23/00 701/3 |
| 2011/0118908 | A1 | * | 5/2011 | Boorman | G08G 5/0021 701/14 |

* cited by examiner

*Primary Examiner* — Rodney Butler
(74) *Attorney, Agent, or Firm* — Angel N. Gerdzhikov; Donna P. Suchy; Daniel M. Barbieri

(57) ABSTRACT

A four dimensional time controlled flight management system (4DFMS) and related method generate an initial descent profile for an aircraft in flight. The initial descent profile is planned in compliance with a 1) a published arrival procedure at an airport, 2) a fuel-efficient optimized profile descent (OPD), and a required time of arrival (RTA) constraint at a metering waypoint on the published arrival. The 4DFMS maintains awareness of the changing wind conditions during cruise mode and descent mode of operation and triggers a replan of the descent profile should compliance fall outside of a 95% confidence level at a six second compliance requirement in the descent mode. The system continuously generates a total time error at the metering waypoint by projecting estimated time of arrivals at active waypoints to determine accurate altitude, airspeed, and time compliance at the metering waypoint.

20 Claims, 14 Drawing Sheets

FOUR DIMENSIONAL FLIGHT MANAGEMENT WITH TIME CONTROL SYSTEM AND RELATED METHOD

CROSS REFERENCE TO RELATED APPLICATIONS

The present application is a Continuation in Part and claims the benefit under 35 U.S.C. 120 of pending U.S. application Ser. No. 14/283,683 filed on May 21, 2014 entitled "Predictable and Required Time of Arrival Compliant Optimized Profile Descents With Four Dimensional Flight Management System and Related Method," the contents of which are incorporated by reference herein in their entirety.

FIELD OF THE INVENTIVE CONCEPTS

The inventive concepts disclosed herein relate generally to compliance with air traffic control requirements while optimizing a fuel efficient descent profile of an aircraft. More particularly, embodiments of the inventive concepts disclosed herein relate to a system and method for a Time Controlled four dimensional Flight Management System (FMS) configured for generating a four dimensional flight path of an optimized profile descent that is accurate in compliance with an assigned Required Time of Arrival (RTA).

BACKGROUND

Air Traffic Control (ATC) tasked with safe separation of aircraft may delineate procedures and directives for entry into certain airspace. An operator requesting permission to enter the airspace must be prepared to comply with the delineated procedures. One such procedure may include a Required Time of Arrival (RTA) defined as a time an aircraft must arrive at a specific fixed position to comply with an issued RTA clearance and remain clear of other traffic.

In the United States, the Federal Aviation Administration (FAA) may adopt a Minimum Aviation System Performance Standards (MASPS) set by the Radio Technical Commission for Aeronautics (RTCA). RTCA may periodically issue changes to its MASPS Required Navigation Performance (RNP) standards for Area Navigation. Included in a recent RTCA change, a 10 second RTA compliance window in the descent phase of flight has been set as a standard within which operators may be required to comply.

Four Dimensional (4-D) (3-dimensional position plus time) trajectory architecture may be a critical component for both FAA's Next Generation Air Transportation Modernization (NextGen) program and Single European Sky ATM Research (SESAR) program. Under this 4-D trajectory concept, Flight Management Systems (FMS) not only need to generate the 4-D trajectory of the aircraft, but also to coordinate with the flight control system to track this 4-D trajectory within required positioning and timing thresholds. This 4-D trajectory architecture requires the FMS to ensure the aircraft does indeed arrive at a metering waypoint within 30 seconds (cruise phase of flight) or within 6 seconds (descent phase of flight) of its assigned RTA.

Current FMS capabilities may easily comply with the RTA accuracy of 30 seconds at a 95% probability for metering waypoints in cruise. However, current FMSs may have significant difficulty in complying with the RTA accuracy of six seconds at the 95% probability for metering waypoints on descent due to continuously changing external variables which create a problem too difficult for the traditional FMS to solve. These variables may include 1) a much tighter time threshold requirement, 2) true airspeed may likely continuously change during descent, 3) wind velocity varies over altitude causing actual ground speed to vary, and 4) standard (among all aircraft within the airspace) descent speed profiles are required.

Optimized Profile Descents (OPD) or Continuous Descent Approaches may use idle or near-idle thrust during descents to reduce fuel consumption, engine noise and carbon emissions. With Optimized Profile Descents, aircraft may descend continuously from cruise altitude to the bottom of descent or to an initial approach fix without level path segments. However, to utilize OPDs without reducing the traffic throughput around an airport, ATC may impose a RTA at a metering waypoint to safely merge incoming traffic. If idle thrust is used during the OPD, the descent profile is a function of not only aircraft speed, aircraft weight, wind and temperature, but also aircraft platforms and engine types. Therefore, the idle descent profile may vary from one aircraft to another and from one flight to another.

One highly efficient performance characteristic of a transport category aircraft may include a constant cruise phase followed by an idle-power descent from cruise altitude to the landing. This idle-power descent may include a constant Mach descent phase, a constant calibrated airspeed (CAS) descent phase, a deceleration from constant CAS to a statutory speed (e.g., 250 knots below 10,000 feet MSL), a 250 knot descent phase, a deceleration to final approach speed, and a landing. One goal for maximum efficiency may include an idle power descent from a Top of Descent (TOD) point (often 40,000 feet mean sea level (MSL)) to 1000 feet above ground level (AGL) where engines must normally be spooled up for landing and possible missed approach. This most efficient idle-power descent, however, is often unavailable due to a variety of path constraints including additional traffic in the terminal area.

During aircraft transition from enroute to landing, air traffic controllers may frequently issue instructions (or clearances) to change aircraft trajectories based on this additional traffic. These instructions may include temporary altitude assignments, increasing or decreasing speed adjustments, and temporary off-course lateral vectoring. These instructions enable traffic controllers to manage air traffic flow while ensuring proper aircraft separation and flight safety. However, these controller instructions cause inefficiencies in performance and require aircraft to execute suboptimal maneuvers, such as stair-step descents and lengthy delays at one altitude. A stair-step descent burns significantly more fuel and generates more carbon emissions and engine noise than an uninterrupted OPD because OPDs use idle or near-idle thrust to execute a smooth speed-and-altitude profile during the descent phase of flight while complying with multiple path constraints.

To enable OPDs without reducing traffic capacity throughout the Terminal Radar Approach Control (TRACON) area, a RTA constraint is usually imposed by ATC on a metering waypoint on the boundary of the TRACON area or on an Initial Approach Fix (IAF) to enable safe merging of air traffic. Therefore, upon receiving the assigned RTA well prior to the RTA, the onboard FMS must be able to quickly construct the 4-dimensional (4-D) trajectory of an OPD in accurate compliance with the assigned RTA.

A maximum performance OPD may be the best case scenario based on fuel economy, carbon emissions, and cost to the operator. However, the maximum performance idle descent OPD may not comply with the traffic clearance requirements of the local TRACON. Consequently, a need exists for a system and related method which combines the benefits of generating a path to accurately comply with a six second RTA coupled with a maximum performance OPD to minimize fuel consumption.

SUMMARY

Accordingly, an embodiment of the inventive concepts disclosed herein is directed to a system for four dimensional time controlled flight management. The system may comprise a four dimensional flight management system (4DFMS) onboard an aircraft, the 4DFMS including a flight management computer (FMC) operably coupled with a non-transitory memory, a time control module operably coupled with the FMC, an input output device, a display, a route information module, an aircraft information module, and a weather information module, the FMC including a one processor configured for controlling a flight control system and an autothrottle system associated with control of the aircraft, the FMC further configured for generating an initial descent path for the aircraft, the initial descent path including a top of descent and a reference speed.

In embodiments, the initial descent path is planned in compliance with an assigned required time of arrival (RTA) at a metering waypoint, a four dimensional published arrival procedure, and an optimized profile descent, the time control module configured for: receiving sensor data including position data, velocity data and altitude data associated with the aircraft, receiving weather information associated with the four dimensional published arrival procedure via the weather information module, determining a total time error (TTE) at the metering waypoint, the TTE based on the weather information, the assigned RTA at the metering waypoint, an estimated time of arrival (ETA) at the metering waypoint, a planned time of arrival (ETAW) at an active waypoint and an actual time of arrival (ATA) at the active waypoint.

The system may determine a mode of flight of the aircraft, the mode of flight one of a cruise mode and a descent mode, triggering a time control replan of the initial descent path, the triggering based on the TTE and the mode of flight, the time control replan in compliance with the assigned RTA at the metering waypoint, the four dimensional published arrival procedure, and the optimized profile descent, commanding the FMC to comply with the time control replan, commanding the FMC to display the time control replan of the initial descent path to an aircraft crewmember on the display.

An additional embodiment of the inventive concepts disclosed herein may include a system wherein the initial descent path and the time control replan are both accurate at the metering waypoint to within one of: 95% confidence level of the RTA and six seconds of the RTA wherein the triggering a time control replan is triggered at a TTE of one of: six seconds when the FMS is in the cruise mode and three seconds when the FMS is in the descent mode.

An additional embodiment of the inventive concepts disclosed herein may include a system wherein the aircraft is one of: a helicopter, a manned aerial vehicle, and an unmanned aerial vehicle and wherein the time control module is further configured to produce a FMC command recognizable by the FMS, the FMC command further includes one of: an airspeed, a power setting, and a rate of descent.

An additional embodiment of the inventive concepts disclosed herein may include a system wherein the four dimensional published arrival procedure includes a lateral path, a vertical path, and a speed requirement and wherein the weather information further comprises a plurality of wind vectors at a corresponding plurality of altitudes, the plurality of wind vectors updatable via a wireless signal.

An additional embodiment of the inventive concepts disclosed herein may include a system wherein the FMC continuously calculates the total time error (TTE) at a frequency of one hertz and wherein the initial descent path further includes a descent table including two required waypoints and ATA values at the two required waypoints.

An additional embodiment of the inventive concepts disclosed herein may include a system wherein the ETA at the metering waypoint, the ETAW at the active waypoint and the ATA at the active waypoint are updated using updated weather information.

An additional embodiment of the inventive concepts disclosed herein may include a method for four dimensional time controlled flight management, comprising: managing a four dimensional flight path of an aircraft via a four dimensional flight management system (4DFMS) onboard the aircraft, the 4DFMS including a flight management computer (FMC) including a processor operably coupled with a non-transitory memory, a time control module, an input output, a display, a route information module, an aircraft information module, and a weather information module, generating an initial descent path for the aircraft via the FMC.

The initial descent path may include a top of descent and a reference speed, the initial descent path in compliance with 1) an assigned required time of arrival (RTA) at a metering waypoint, 2) a four dimensional published arrival procedure, and 3) an optimized profile descent, controlling a flight control system and an autothrottle system onboard the aircraft via the FMC, receiving sensor data within a time control module operatively connected with the 4DFMS, the sensor data including position data, velocity data and altitude data associated with the aircraft, receiving weather information associated with the four dimensional published arrival procedure via the weather information module, determining a total time error (TTE) at the metering waypoint, the TTE based on the weather information, the assigned RTA at the metering waypoint, an estimated time of arrival (ETA) at the metering waypoint, a planned time of arrival (ETAW) at an active waypoint and an actual time of arrival (ATA) at the active waypoint.

The method may determine a mode of flight of the aircraft, the mode of flight may be a cruise mode and a descent mode, triggering a time control replan of the initial descent path, the triggering based on the TTE and the mode of flight, the time control replan in compliance with the assigned RTA at the metering waypoint, the four dimensional published arrival procedure, and the optimized profile descent, commanding the FMC to comply with the time control replan, displaying the time control replan of the initial descent path to an aircraft crewmember on a display.

It is to be understood that both the foregoing general description and the following detailed description are exemplary and explanatory only and are not necessarily restrictive of the inventive concepts disclosed and claimed herein. The accompanying drawings, which are incorporated in and constitute a part of the specification, illustrate embodiments of the inventive concepts disclosed herein and together with the general description, serve to explain the principles of the inventive concepts disclosed herein.

BRIEF DESCRIPTION OF THE DRAWINGS

The numerous advantages of the inventive concepts disclosed herein may be better understood by those skilled in the art by reference to the accompanying figures in which.

DETAILED DESCRIPTION

Figure 1:
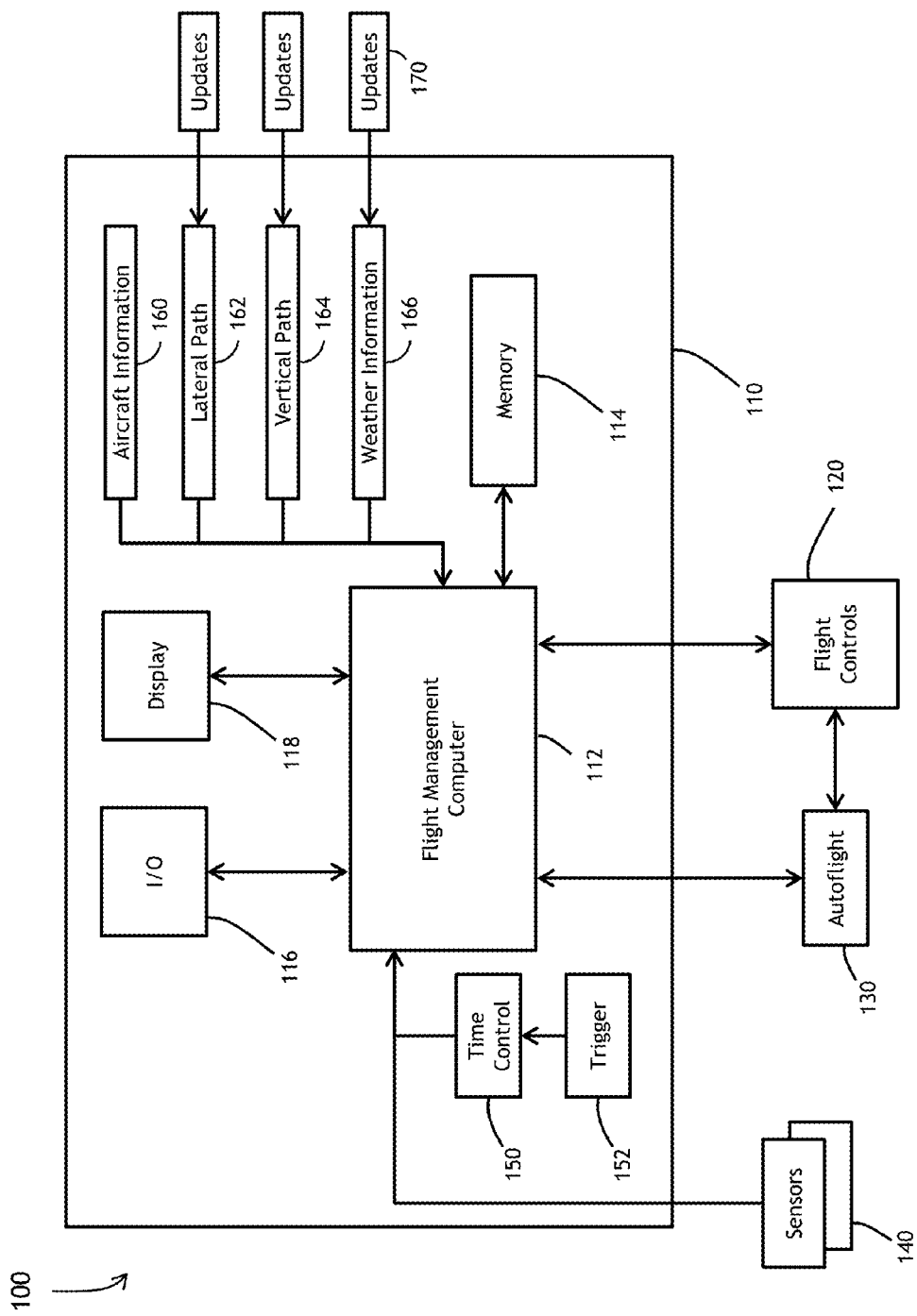
FIG. 1 is an exemplary system for four dimensional flight management with time control provided by one embodiment of the inventive concepts disclosed herein.

Reference will now be made in detail to the presently preferred embodiments of the inventive concepts disclosed herein, examples of which are illustrated in the accompanying drawings.

The following description presents certain specific embodiments of the inventive concepts disclosed herein. However, the inventive concepts disclosed herein may be embodied in a multitude of different ways as defined and covered by the claims. In this description, reference is made to the drawings wherein like parts are designated with like numerals throughout.

The inventive concepts disclosed herein may operate in concert with a real-time auto router named Airborne E* (pronounced as E Star) that maintains the in-flight, long-range 4-D trajectory re-planning capability and was designed to meet desired automated routing requirements. Airborne E* is described in U.S. Pat. No. 8,234,068B1 ('068 Patent), issued Jul. 31, 2012, filed Jan. 15, 2009, entitled "System, Module, and Method of Constructing a Flight Path Used by an Avionics System," to Young, et. al. and U.S. patent application Ser. No. 12/870,335 ('335 application) entitled "Rapid Intervisibility Determination In Resource-Constrained Computational Environments" filed on Aug. 27, 2010, by Young, et. al., and U.S. patent application Ser. No. 13/949,612 ('612 application) entitled In-Flight Generation Of RTA-Compliant Optimal Profile Descent Paths filed on Jul. 24, 2013, by Young, et. al., all of which are incorporated by reference herein in their entirety.

This and all other referenced patents and applications are incorporated herein by reference in their entirety. Further, where a definition or use of a term in a reference, which is incorporated by reference is inconsistent or contrary to the definition of that term provided herein, the definition of that term provided herein applies and the definition of that term in the reference does not apply.

Embodiments of the inventive concepts disclosed herein may include a system and related method capable of combining 1) time controlled RTA compliance within the 95% confidence level for a six second RTA window and 2) fuel-saving Optimized Profile Descents (OPD) path generation. The inventive concepts disclosed herein may adjust a reference 4-D flight profile (i.e., reference signals directed to a FMS and automatic flight control system) requiring no changes to existing autopilot and auto-throttle modules. Since the software for autopilot and auto-throttle are classified as critical software, it may be expensive to modify. Embodiments herein may direct signals to each of these modules in a compliant format readable by the processor of each module. In this manner, there is no need for an expensive modification to update software for autopilot and auto-throttle systems to receive the time controlled signals.

Due to uncertainty of wind and temperature profile data used for planning the initial 4-D trajectory, the systems herein may generate subsequent time controls (or re-plans) needed to adjust the reference 4-D flight profile and ensure the aircraft arrives at a metering waypoint within the required six second threshold at the 95% probability level. Embodiments of the inventive concepts disclosed herein present a feedback time control design that collaborates with the Optimal E* real-time planning module described in the '068 Patent. The proposed time control design not only enables the 4-D FMS with time control to comply with the RTA accuracy of six seconds but also enables the 4-D FMS to execute a fuel-efficient 4-D OPD trajectory.

Embodiments of the inventive concepts disclosed herein may operate to minimize a total fuel consumption from a top of descent to the metering waypoint while subject to the following constraints: altitude constraints (at or above, at or below, at a given altitude), airspeed constraint at an altitude or a waypoint, standard descent speed patterns associated with the aircraft performance and statutory constraints and RTA and target airspeed constraints at the metering waypoint. To comply with these constraints, the systems herein may receive both initial and final conditions. For example, an initial aircraft position and airspeed and position, airspeed and RTA at the metering waypoint (i.e., final condition). The systems herein may generate a descent path of the aircraft by solving a nonlinear, two-point boundary value problem.

REFERENCE CHART

No. Description
100 System
110 4-D FMS with Time Control
112 Flight Management Computer
114 Memory
116 Input Output
118 Display
120 Flight Controls
130 Autoflight
140 Sensors
150 Time Control 152 Trigger
160 Aircraft Information
162 Lateral Path
164 Vertical Path
166 Weather Information
170 Updates
200 Ground Track
220 CREAN
222 CINNY
224 Metering Waypoint (BRINY)
226 OSI
228 MENLO
230 CEPIN
232 SFO
250 BAART
252 BEBOP
300 Arrival Optimized Profile Descent
400 Side View of Published Descent
410 Cruise Segment
412 Constant Mach Segment
414 Constant CAS Segment
416 Deceleration Segment
422 Weather Update Point
450 Top of Descent (TOD)
452 MACH to CAS Transition
454 Statutory CAS Deceleration
456 Configuration CAS Deceleration
500 Signal Flow
502 Reference
504 Error
506 Control
508 Disturbance
512 Traversal Time
514 Generate 4-D Trajectory
520 FMS & Autoflight
522 Control Surfaces & Engines
524 6-DOF Aircraft Dynamics
526 Position & Airspeed
530 Output
542 Sensor Error
600 High Level Diagram of Time Control
610 FMS in VNAV
652 Estimate Total Time Error
654 Trigger Analysis
656 Exit
658 Optimal E* Driver
660 Update Descent Table
662 Store Descent Table
700 Total Time Error Estimate
702 Descent mode or Trigger
704 Exit
706 Determine current leg parameters
708 Assign start and end positions
710 Determine Reference Speed
712 Propagate
714 Collect ATA to next waypoint
716 Calculate TCE
718 Calculate TEE
720 Calculate TTE
722 Cruise mode?
774 Trigger set to 6
726 Trigger set to 3
728 Compare TTE to Trigger
802 Calculate TEE
804 Set Descent Path Free to True
806 Descent Mode?
808 TEE estimates Late?
810 Descent Speed and Above Path
812 Descent Speed at Min?
814 Set Descent Path Free to False
816 Descent Path Free True or False
818 Time Control Mode?
820 Descent Mode?Set Mutators Descent Speed, Speed Crossover, Flight Path
822 Angle
824 Determine Max and Min Descent Speeds
826 Create Speed Table
828 Set Mutators to Fixed Descent Speed
830 Set Mutators to Descent Speed, Flight Path Angle
832 Launch DGA
834 Time Control
836 Cap the Speed Change
838 Top solution Feasible?
840 Feasible except for RTA?
842 Create Descent Table from Chromosome
844 Create Descent Table from Input
846 Exit
900 Graph of Airspeed Curves
1110 Performance Data
1112 Nav Processing
1114 Path Definition and Speed Profile
1116 Path Constraints
1118 VREF Determination
1120 4D Guidance
1162 LNAV
1164 VNAV
1314 Unmanned Aerial Vehicle
1316 Helicopter
1322 DOLPHN
1324 EGRET Referring to FIG. 1, an exemplary system for four dimensional flight management with time control provided by one embodiment of the inventive concepts disclosed herein is shown. The system 100 may include a 4-D FMS with time control 110 (4DFMS) comprising a Flight Management Computer (FMC) 112. FMC 112 may be directly and operationally connected in communication with a plurality of aircraft systems including flight controls 120, auto flight systems 130, and aircraft sensors 140. In addition, FMC 112 may be directly and operationally connected in communication with an Input Output system 116, a display 118, a memory 114, aircraft information 160, updatable lateral path information 162, updatable vertical path information 164, and updatable weather information 166. Updates 170 to each of the lateral path 162, the vertical path 154 and the weather information 166 may provide the 4-D FMS with time control 110 necessary information to increase the accuracy of the flight profile.

The system 100 may employ the time control design to adjust the reference 4-D flight profile in a format recognizable by an existing autoflight system 130 and an existing system of flight controls 120. For example, an embodiment of the system 100 may be installed within an existing flight management system and provide the existing autoflight systems 130 and existing flight controls 120 with signals recognizable by the existing systems.

In embodiments, the system 100 may employ a design for 4-D flight path planning such as Optimal E* hosted within the 4-D FMS with time control 110 as an embedded module. The system 100 may command the 4-D FMS with time control 110 to provide guidance commands to the auto flight system 130 including the autopilot and auto throttle systems to adjust the flight path and speed of the aircraft to ensure the aircraft arrives within the 95% confidence level at a metering waypoint. Embodiments of the inventive concepts disclosed herein may be implemented in software stored in the memory 114 operatively coupled with the onboard flight management computer 112.

The system 100 may further include a time control 150 and associated trigger 152 configured for updating the reference 4-D flight path generated by Optimal E* and in use by the FMS 112. In embodiments, the system 100 may recognize the reference flight path will not be in compliance with an issued RTA or an issued ATC clearance. In this case, the system 100 may enable a trigger 152 to begin the process of generation of a revised reference flight path and command the autoflight systems 130 and the flight controls 120 to comply with the newly planned reference flight path.

Flight management computer 112 may include enhanced algorithms to determine a feasible RTA window at the 95% confidence level. Upon receiving an RTA constraint from ATC, the pilots may input the RTA into the 4-D FMS with time control 110 via the input output system 116. As time may be critical in beginning a flight profile (path and speed) to accurately arrive at the RTA at the metering waypoint, the 4-D FMS with time control 110 must be able to quickly construct the 4-D trajectory that complies with the RTA constraint along with additional path constraints. The system 100 may efficiently employ Optimal E* to generate an initial 4-D trajectory in compliance with all path constraints (e.g., RTA, altitude restrictions, airspeed restrictions, statutory restrictions).

Preflight planning may indicate a specific weather information 166 (e.g., wind and temperature) profile for initial descent planning. However, due to the possible updates 170 to each of the winds and temperature, the system 100 may command subsequent time controls (or replans) to ensure the aircraft arrives at the metering waypoint within the required time threshold of RTA. Without the enhanced time controls of the system 100, an RTA error of 50 seconds or more at the 95% probability level may result.

The system 100 may generate a trigger 152 to cause Optimal E* to perform a time control 150 replan. The system 100 may trigger a time control 150 when it calculates a time difference between the predicted and actual arrival times at a given location on the flight path is greater than a specified time threshold. If the system 100 triggers a time control 150 during a cruise phase of flight, the replanning process may be similar to the initial planning process discussed in the '068 Patent. However, should the system 100 trigger a time control 150 during a descent phase of flight when the FMS is in a descent mode, (i.e., aircraft has flown past a Top of Descent (TOD)), the 4-D FMS with time control 110 may command a simpler form of replanning process since the descent flight path cannot be changed and the system 100 may be limited to a speed adjustment over a fixed descent path.

Figure 2:
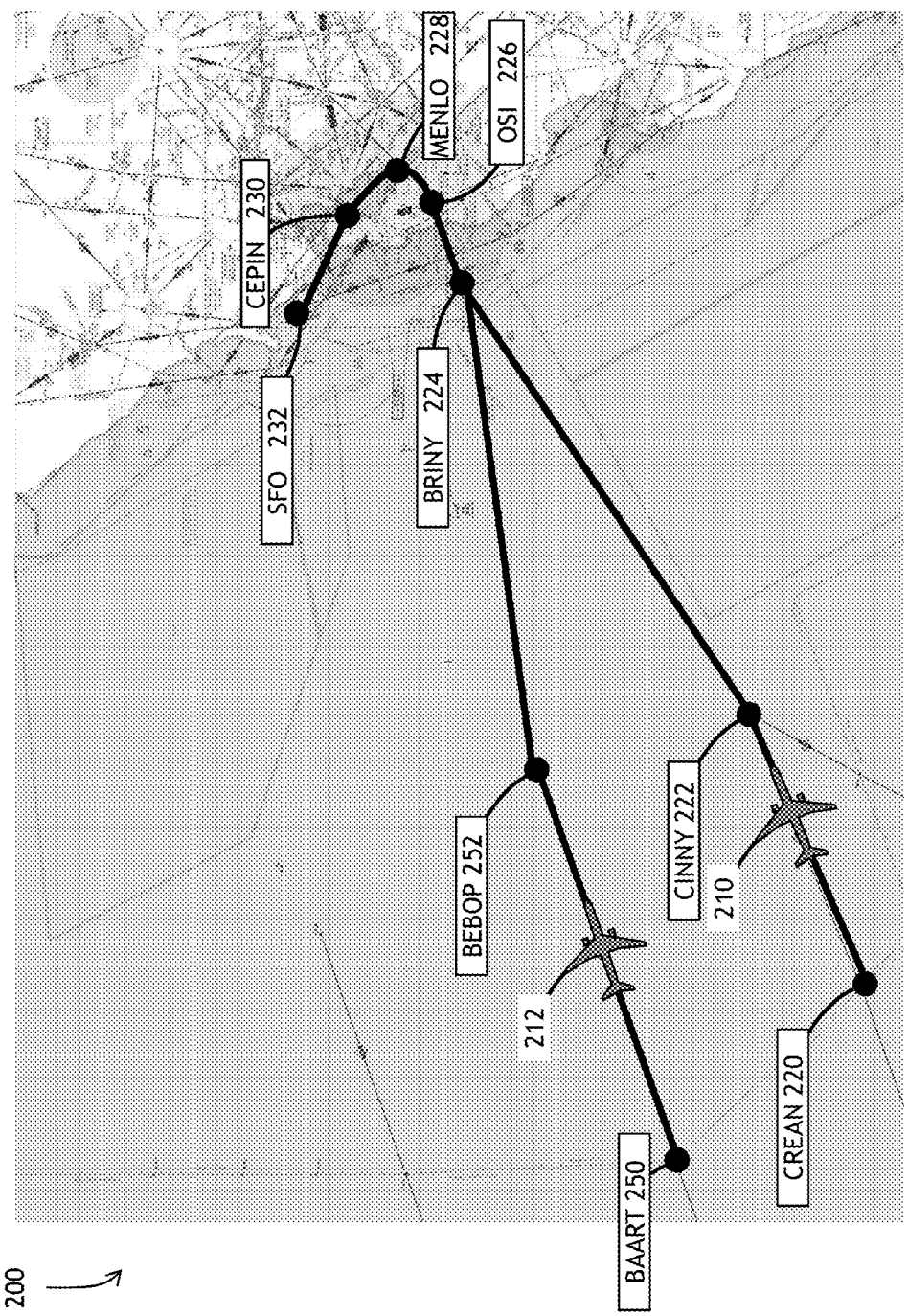
FIG. 2 is an exemplary arrival ground track for which embodiments of the inventive concepts disclosed herein may provide a 4D time controlled arrival.

Referring to FIG. 2, an exemplary arrival ground track for which embodiments of the inventive concepts disclosed herein may provide a 4D time controlled arrival is shown. Ground track 200 may include a first aircraft 210 enroute on a typical arrival profile via CREAN 220, CINNY 222 and BRINY 224 for an OPD into San Francisco International Airport (SFO) 232 from the West. Also, a second aircraft 212 may also be inbound to SFO 232 from the West via BAART 250 BEBOP 252 and BRINY 224. In this exemplary profile, each aircraft 210 and 212 may be routed through a metering waypoint BRINY 224. At such a metering waypoint 224, ATC must separate all arriving aircraft either vertically or by at least five miles laterally for safety of flight.

Ground track 200 may indicate that both aircraft 210 and 212 may arrive at the metering waypoint BRINY 224 near the same time so each aircraft may be assigned a six second window RTA to ensure sufficient lateral (here nose to tail) separation between the two aircraft 210 and 212 at BRINY 224. For example, first aircraft 210 may be assigned a BRINY RTA at 16:00:00 while the second aircraft 212 may be assigned a RTA of 16:02:00. As each aircraft may be in the descent profile and each 4-D FMS with time control 110 may be in the descent mode, the system 100 may operate onboard each individual aircraft 210 and 212 to ensure each of the aircraft 210 and 212 is able to meet the assigned RTA within six seconds at a 95% confidence level.

Once each of the system 100 achieves accurate RTA compliance, each individual aircraft 210 and 212 may then safely traverse the remaining waypoints of the arrival route including OSI 226, MENLO 228 and CEPIN 230 enroute to SFO 232.

Figure 3:
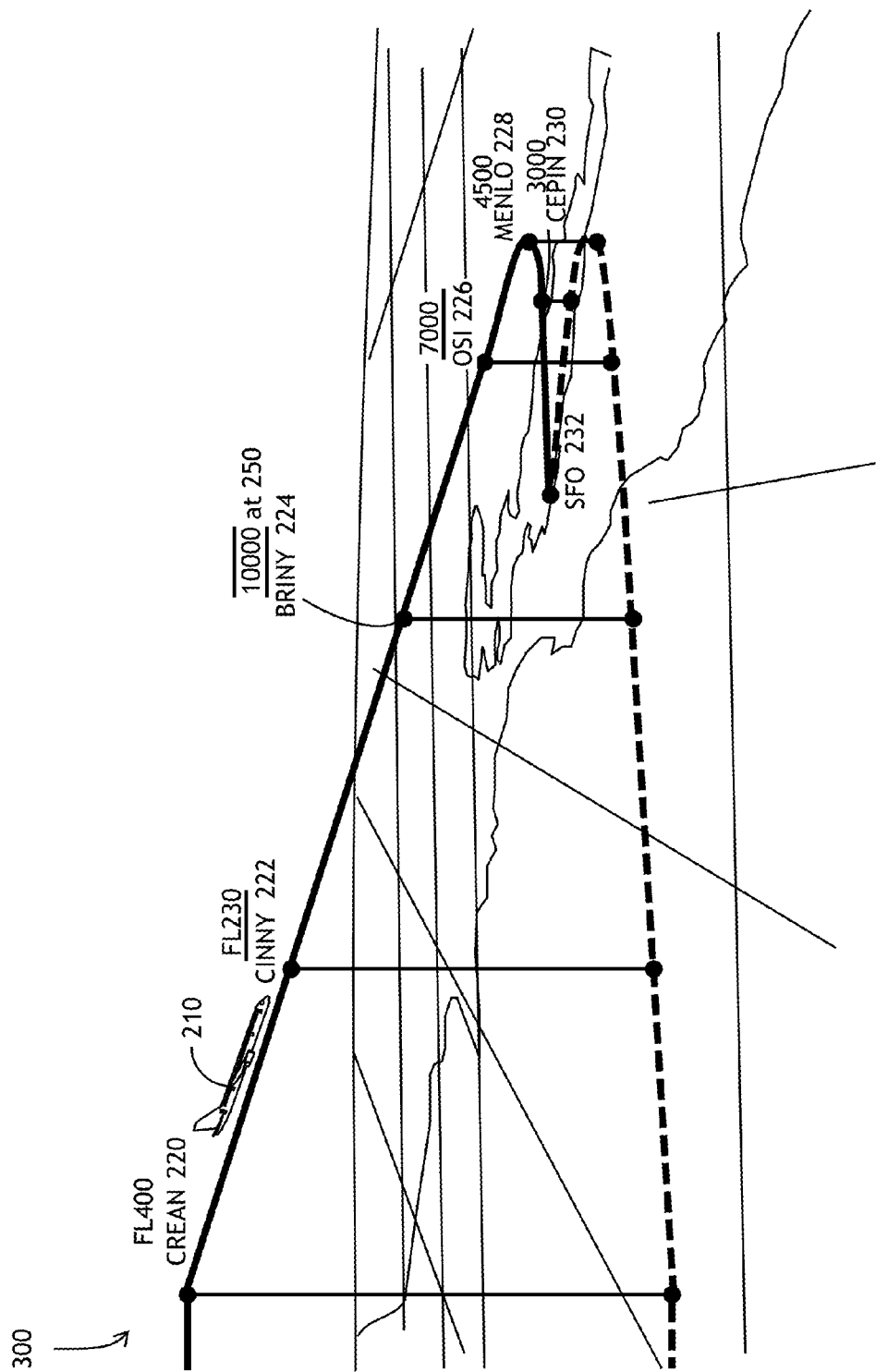
FIG. 3 is an exemplary published arrival for which embodiments of the inventive concepts disclosed herein may provide a 4D time controlled OPD.

Referring to FIG. 3, an exemplary published arrival for which embodiments of the inventive concepts disclosed herein may provide a 4D time controlled OPD is shown. An arrival 300 into SFO 232 from the West may include the metering waypoint BRINY 224. Each arriving aircraft 210 may flow through the same points on the arrival including BRINY 224 to ensure the lateral separation during the terminal phase. At BRINY 224 and beyond, ATC may require a similar speed for each aircraft to fly through the remaining points OSI 226, MENLO 228 and CEPIN 230 of the arrival to reach SFO 232 with a minimum of 5 miles of lateral (nose to tail) separation.

The system 100 may operate to generate for the first aircraft 210 an OPD within the mandatory constraints of the arrival 300 as well as in compliance with the exemplary 16:00:00 RTA at BRINY. Often, arrivals such as the arrival 300 may include mandatory altitudes and airspeeds to ensure separation 1) between aircraft on the same arrival, 2) from other aircraft on a departure, and 3) from other aircraft on a published route not associated with the arrival 300. Here, arrival 300 includes: 1) a mandatory minimum altitude a CINNY of FL230, 2) a mandatory altitude of 10,000 feet at BRINY coupled with a mandatory airspeed of 250 knots, 3) a mandatory minimum altitude at OSI of 7,000 and 4) a mandatory minimum altitude at MENLO of 4,500.

During the first aircraft 210 descent between CREAN 220 and CINNY 222, an update 170 may be received to the weather information 166. Should the system 100 generate a trigger 152 based on this update 170, the system 100 may operate to adjust the reference flight profile and generate an updated command to the flight controls 120 and to the autoflight system 130 to ensure 95% compliance with both the assigned RTA at the metering waypoint 224 as well as in compliance with the published altitude and airspeed at the metering waypoint 224.

Figure 4:
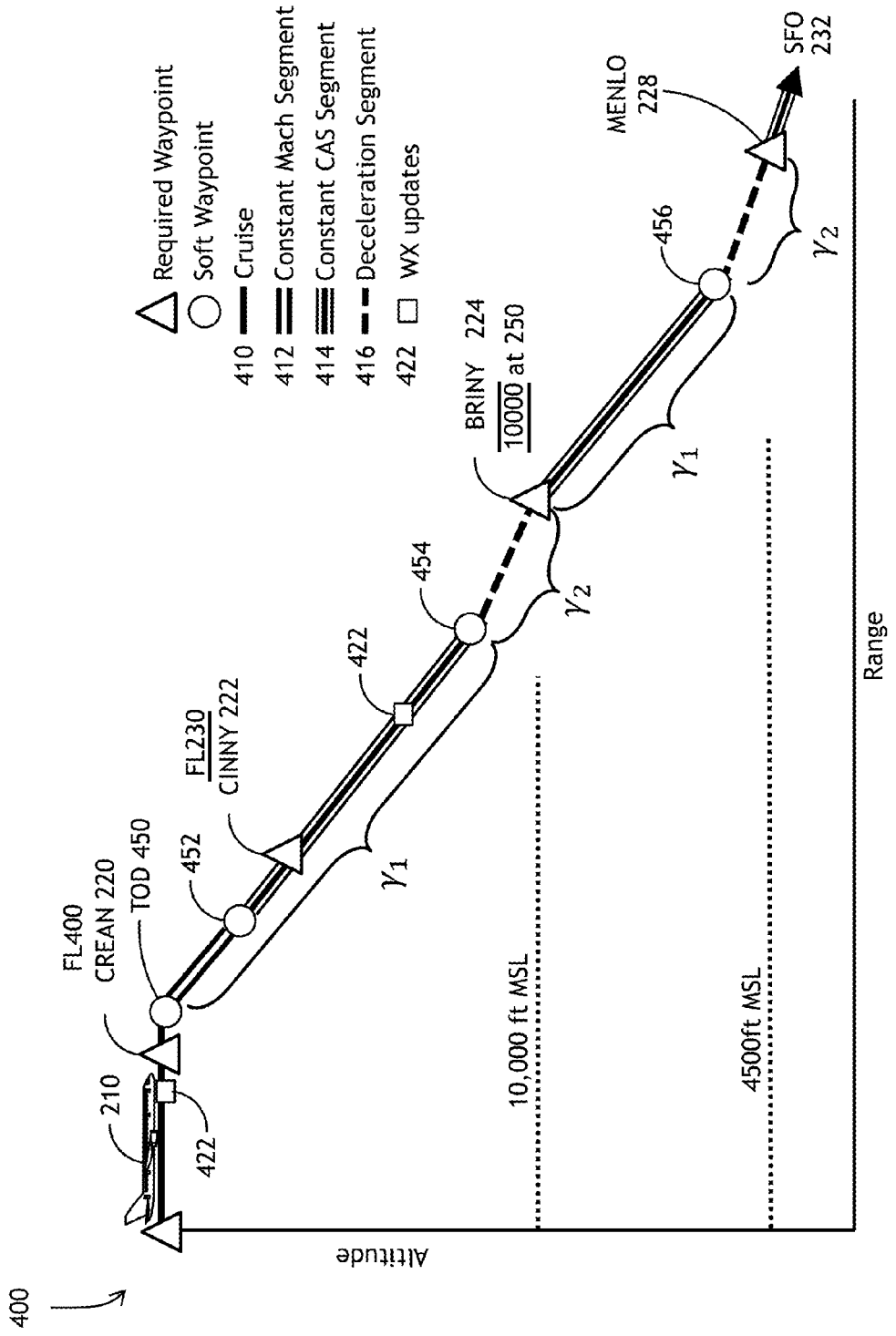
FIG. 4 is a side view of an exemplary published arrival for which embodiments of the inventive concepts disclosed herein may provide a 4D time controlled OPD.

Referring to FIG. 4, a side view of an exemplary published arrival for which embodiments of the inventive concepts disclosed herein may provide a 4D time controlled OPD is shown. Side view 400 of arrival 300 may accurately indicate a vertical path of the arriving first aircraft 210. In this example, the first aircraft 210 is assigned the arrival 300 into SFO 232 as above. As used herein, a required waypoint may be defined as a waypoint an aircraft is required to fly over to comply with an ATC clearance. Here, CREAN 220 and CINNY 222 are examples of required waypoints. Also, as used herein, a soft waypoint may be defined as a waypoint generated by the 4-D FMS with time control 110 to enable the first aircraft 210 to meet restrictions at the required or soft waypoints. Top of Descent (TOD) 420 is one example of a soft waypoint.

A standard arrival procedure may include a cruise segment 410 followed by a constant Mach descent segment 412, one or more constant CAS segments 414 and one or more deceleration segments 416 to comply with the published altitudes on the arrival 300.

The system 100 may employ the 4-D FMS with time control 110 to generate the path for the first aircraft 210 to arrive at each of the soft waypoints and required waypoints within compliance of the required parameters. On the arrival 400, required waypoints such as CREAN 220 and soft waypoints such as Mach to CAS transition 452 may be bounds within which the 4-D FMS with time control 110 may determine accurate path characteristics required of the first aircraft 210. For example, a required waypoint such as MENLO 228 may include lateral points/fixes over which the first aircraft 210 must fly to comply with the arrival. In addition, the required waypoints may include a published speed and altitude with which the first aircraft 210 must comply.

Conversely, the system 100 may internally produce soft waypoints to enable the first aircraft 210 to comply with the required waypoints. As time and distance is required to reduce airspeed and decrease altitude for the transition from a higher speed/altitude to a lower speed/altitude, the system may generate soft waypoints to begin the transition from one state to the next. For example, should the first aircraft 210 be required to comply with the speeds and altitudes published on the arrival 300, the system 100 may generate a TOD 450, a Mach to CAS transition 452, a statutory deceleration 454 and a configuration deceleration 456 to ensure the first aircraft 210 is able to comply with the assigned restrictions at the required waypoints (e.g., 10,000 and 250 kts at BRINY 224).

The system 100 may actively operate to update 170 weather information 166 periodically as indicated by update points 422. As the system 100 updates the weather information 166, it may recalculate the reference path to more accurately comply with the restriction imposed by the required waypoints on the arrival.

As the system 100 may update 170 weather information 166 after the first aircraft 210 has passed the original TOD 450 may require additional external input (e.g., power or drag) for the first aircraft 210 to comply with the required waypoint restrictions on the published arrival. For example, should an update 170 to weather information 166 produce a situation where performance is better than expected, the 4-D FMS with time control 110 may command the flight controls 120 to extend the speed brakes to ensure path and RTA compliance. Conversely, should an update 170 to the weather information 166 produce a situation where performance is less than originally planned, the 4-D FMS with time control 110 may command the autoflight system 130 to increase power via the autothrottles to maintain the path and RTA compliance.

The trajectory for an OPD procedure may use two types of speed segments: 1) one or more constant speed segments 452 and 454 (i.e., constant Calibrated Air Speed (CAS) 454 and constant Mach Segment 452); and 2) one or more constant deceleration segments 456. The system 100 may use a layered approach to generate an initial RTA-compliant OPD trajectory that also may use the two types of speed segments. One layer may approximate an idle descent path with path segments that have constant flight path angles to create a reference path. An additional layer may use a Deterministic Genetic Algorithm (DGA)-based method to refine the reference path.

As shown in FIG. 4, the system 100 may define two deceleration segments 456 by path segments with the same flight path angle $\gamma_2$. The system 100 may use path segments with the same flight path angle $\gamma_1$ to define constant speed segments.

Thus, the number of generated flight path angles for the reference descent path may be equal to the number of speed segment types (here, 2). The system 100 may select the shallowest flight path angle of all constant speed segments 414 of the idle descent path as $\gamma_1$, and may select the shallowest flight path angle of all deceleration segments 416 of the path as $\gamma_2$.

The system 100 may construct the reference path by starting from the final waypoint of the descent path (here, MENLO 228) and working backward to the cruise altitude (here, FL400). The system 100 determines the TOD 450 location as the interception point of the cruise altitude and the descent path.

Figure 5:
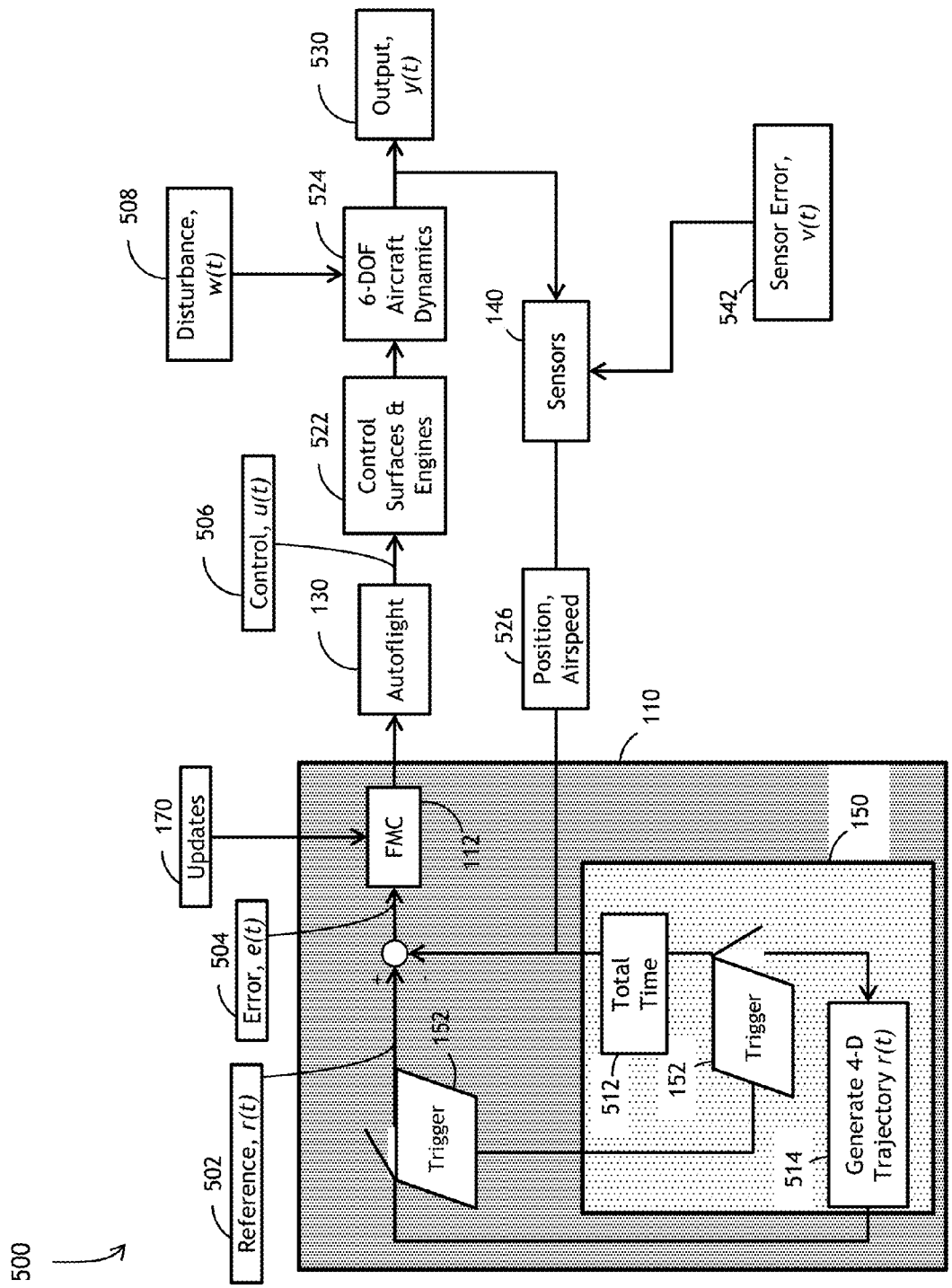
FIG. 5 is a diagram of an exemplary signal flow for time control in accordance with one embodiment of the inventive concepts disclosed herein.

Referring to FIG. 5, a diagram of an exemplary signal flow for time control in accordance with one embodiment of the inventive concepts disclosed herein is shown. Signal flow 500 may indicate a relationship between time control 150 and each of the elements of the 4-D FMS with time control 110.

The signal flow 500 employed by the system 100 may generate the system 100 initial reference path 502 as well as a periodic replans of the reference path should one or more updates 170 operate to remove the first aircraft 210 compliance outside of desired parameters. Signal flow 500 components may include the 4-D FMS with time control 110 including the FMC 112, time control 150 and trigger 152. The autoflight systems 130; control surfaces and engines 522; 6-Direction of Flight (DOF) aircraft dynamics 524 and sensors 140. Inputs to the signal flow 500 may include a disturbance w(t) 508 and sensor error v(t) 542 while outputs may include output y(t) 530. Trigger 152 may operate to begin the replan process for the 4-D FMS with time control 110.

The updates 170 may include a plurality of factors which may change the compliance of the reference path and speed with respect to the assigned required waypoints and soft waypoints and the RTA. For example, an update 170 to the weather information 166 including winds different from forecast may operate for the system 100 to initiate the trigger 152. Also, due to the uncertainty of weather information 166 including wind and temperature profile data used for planning the reference 502 4D trajectory, the system 100 may initiate subsequent replans after initial planning to ensure the first aircraft 210 arrives at the metering waypoint 224 within the required time threshold of RTA.

The signal flow 500 operation may begin with the system 100 closing of trigger 152 due to one of the updates 170. The signal flow 500 may compare the reference path 502 with current position and airspeed 526 to determine an error 504. The FMC may process the error 504 and send a control input 506 to control surfaces and engines 522 via the autoflight systems 130.

As a feedback mechanism, the 6-DOF aircraft dynamics 524 may receive an indication of the disturbance 508 and transmit the output signal 530 to sensors 140 as well as to additional locations such as the FMC 112. Sensors 140 may operate to indicate current position and airspeed 526. Traversal time 512 may operate as one input to 4-D trajectory generation module 514 to determine the replanned reference path. One goal of the system 100 is control of an error in total time 512, which may be a functional of a plurality of inputs. The 4-D trajectory generation module 514 may also generate a descent table used to determine airspeeds and times throughout the descent at each waypoint in the descent. Initially based on current weather information 166, the descent table may provide an input to the FMC 112 to plan the appropriate signals to send to ensure the descent speeds are met.

Figure 6:
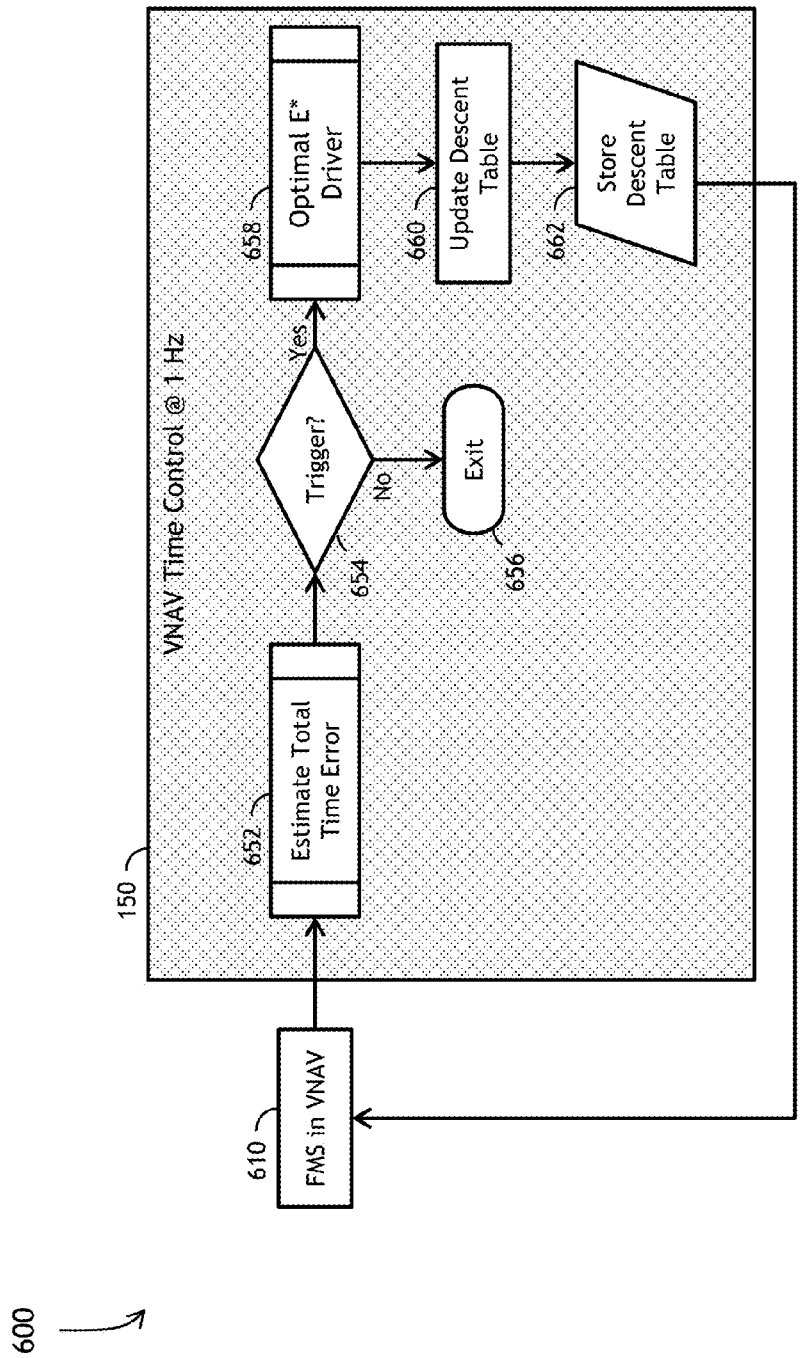
FIG. 6 is a high level diagram for time control in vertical navigation (VNAV) in accordance with one embodiment of the inventive concepts disclosed herein.

Referring to FIG. 6, a high level diagram for time control in vertical navigation (VNAV) in accordance with one embodiment of the inventive concepts disclosed herein is shown.

Within the 4-D FMS with time control 110, a VNAV function (or mode) 610 of the FMS may be one interface to retrieve a new descent table (i.e., a new 4-D reference path 502) from an onboard memory 114. Based on the new descent table and current aircraft states, the VNAV function may generate pitch, roll and reference airspeed commands to the control surfaces and engines 522 via the autoflight systems 130.

A process flow of time control 150 working together with VNAV 610 may include an estimation of the Total Time Error (TTE) at a step 652 which may or may not generate a trigger 152. Should a query 654 determine a trigger 152 is not generated, the process flow may end at a step 656. However, should the query 654 determine the system 100 has generated a trigger 152, the system 100 may employ the optimal E* Driver at a step 658 to determine a new reference path and descent table. Once the new descent table is generated, the time control 150 may update the descent table at a step 660 and store the descent table in the memory 114 at a step 662.

Current VNAV functions may operate at a rate of 10 Hz, while, in one embodiment, the time control function 150 may operate less frequently at a rate of 1 Hz. The system 100 may calculate and use a TTE 652 as one method of determining if a trigger 152 may be required where:

$$TTE = TCE + TDE + TEE \quad (1)$$

Where TCE is the Time Control Error at the metering waypoint 224 and may be computed as:

$$TCE = RTA - ETA \quad (2)$$

Where ETA is the estimated (or planned) arrival time at the metering waypoint 224 and RTA is the Required Time of Arrival at the metering waypoint; TDE is the Time Definition Error and is assumed to be zero since errors in GPS time is usually relatively small; TEE is the Time Estimation Error at the next waypoint in the descent table and may be computed as:

$$TEE = ETA_W - ATA \quad (3)$$

Where ETA is the estimated (planned) arrival time at the next waypoint and ATA is the arrival time at the next waypoint that is determined by propagating the actual aircraft states forward to the next waypoint with Energy Equations found in the '612 application.

When computing TTE, TEE at the next waypoint may be assumed as a constant traversal time offset for the remaining flight path. Therefore, TEE at the next waypoint may be added with TCE at the metering waypoint 224 to compute TTE at the metering waypoint 224. When the first aircraft 210 is actually on the final path segment with the metering waypoint 224 as the end location, $ETA = ETA_W$. Then, $TTE = RTA - ATA$.

When the system 100 triggers 152 a time control 150, the Optimal E* Driver at the step 658 replans a new descent table (i.e., 4-D trajectory profile) to reject external disturbances, while complying with flight constraints, target airspeed and RTA. If a new feasible flight profile can be determined, the system 100 generates a new descent table and stores the new descent table within a database accessible by the VNAV function.

Figure 7:
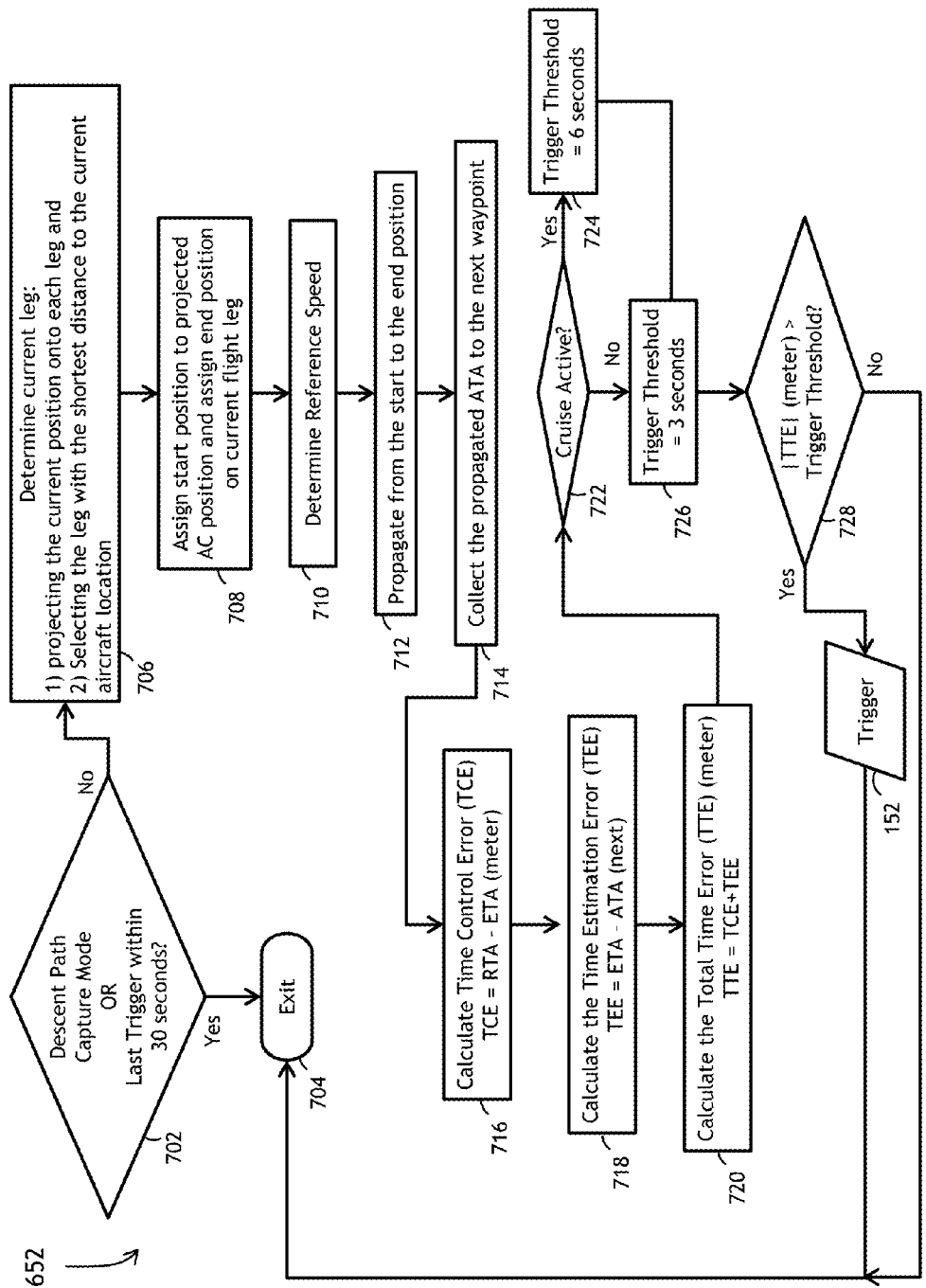
FIG. 7 is a processing diagram for estimating total time error in accordance with one embodiment of the inventive concepts disclosed herein.

Referring to FIG. 7, a processing diagram for estimating total time error in accordance with one embodiment of the inventive concepts disclosed herein is shown. Estimate of TTE 652 may comprise a plurality of steps to determine if the system 100 may invoke a trigger 152 to begin a replan process.

Estimate of TTE 652 may begin at a query 702 to determine if either the FMS has captured the descent path or the last trigger has been within 30 seconds. If the result of query 702 is positive, the process may exist at a step 704. If the result of query 702 is negative, the process may continue at a step 706 with determining information for a current leg of the descent path including 1) projecting the current position onto each leg and 2) selecting the leg with the shortest distance to the current aircraft location. The process may continue at a step 708 with assigning a start position to a projected aircraft position and assigning an end position on the current flight leg. Process 652 may continue at a step 710 with determining a reference speed and, at a step 712, propagating from the start to the end position. The process may continue at a step 714 with collecting the propagated ATA to the next waypoint and, at a step 716 calculating the TCE as a function of RTA−ETA at the metering waypoint 224.

Estimate of TTE 652 may continue at a step 718 with calculating the TEE as ETA−ATA at the next waypoint and, at a step 720, calculating the TTE at the metering waypoint 224 as TCA+TEE. In embodiments, the TEE computed at the next waypoint may be treated as a constant time offset for the remaining flight path. A next query 722 may determine if the FMS is in the cruise mode to determine whether the trigger 152 should be wither three or six seconds. If in the cruise mode active the trigger will be set at a step 724 at six seconds while if not in a cruise mode, the trigger will be set at three seconds at a step 726. A next query 728 will determine if the TTE is greater than the trigger threshold of six or three seconds. If the answer to query 728 is affirmative, then the system 100 may invoke the trigger 152 while if the answer is negative, the process returns to exit at the step 704.

Figure 8A:
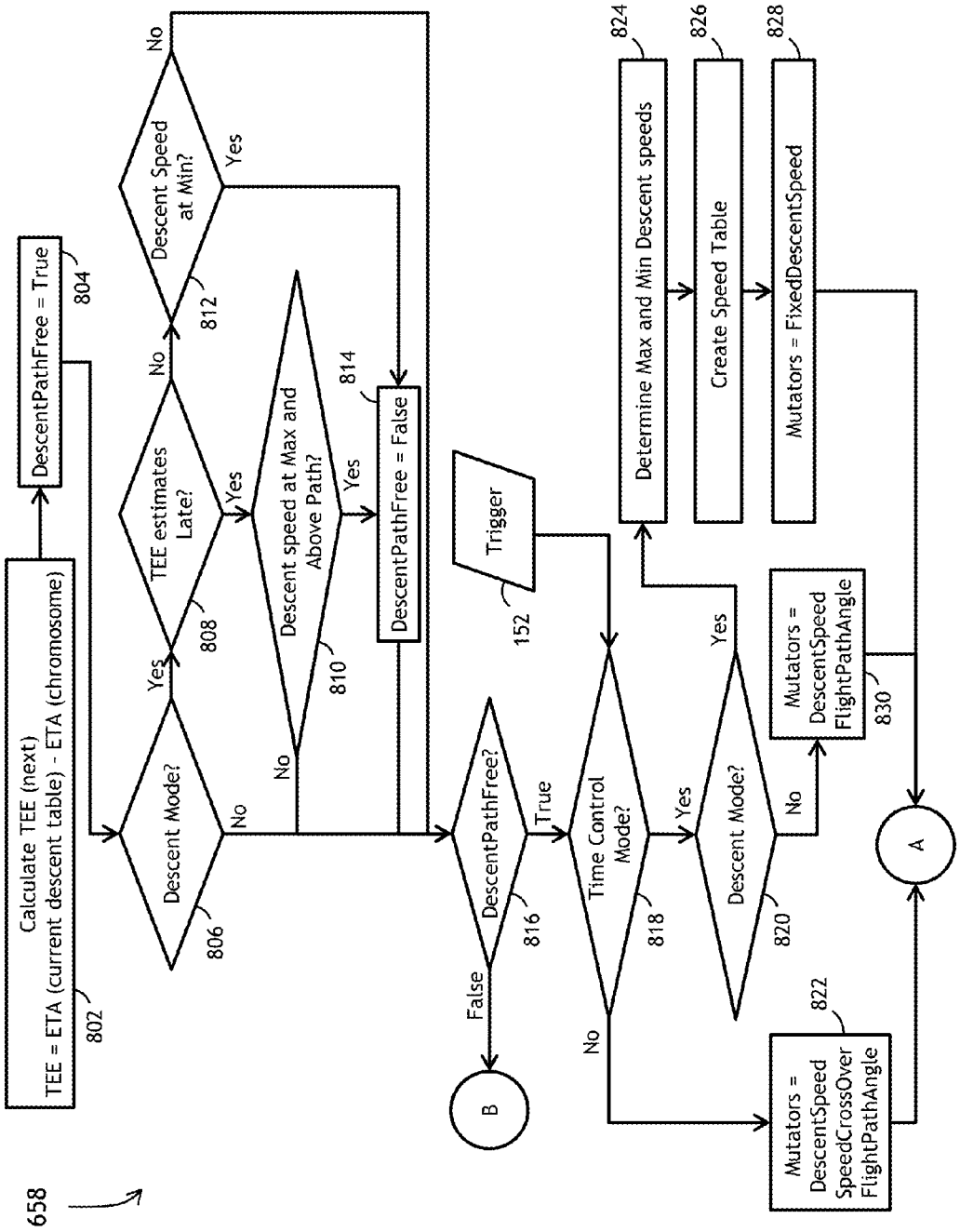
FIGS. 8A and 8B are a processing diagram for optimal E* driver used by the time controlled 4DFMS in accordance with one embodiment of the inventive concepts disclosed herein.
Figure 8B:
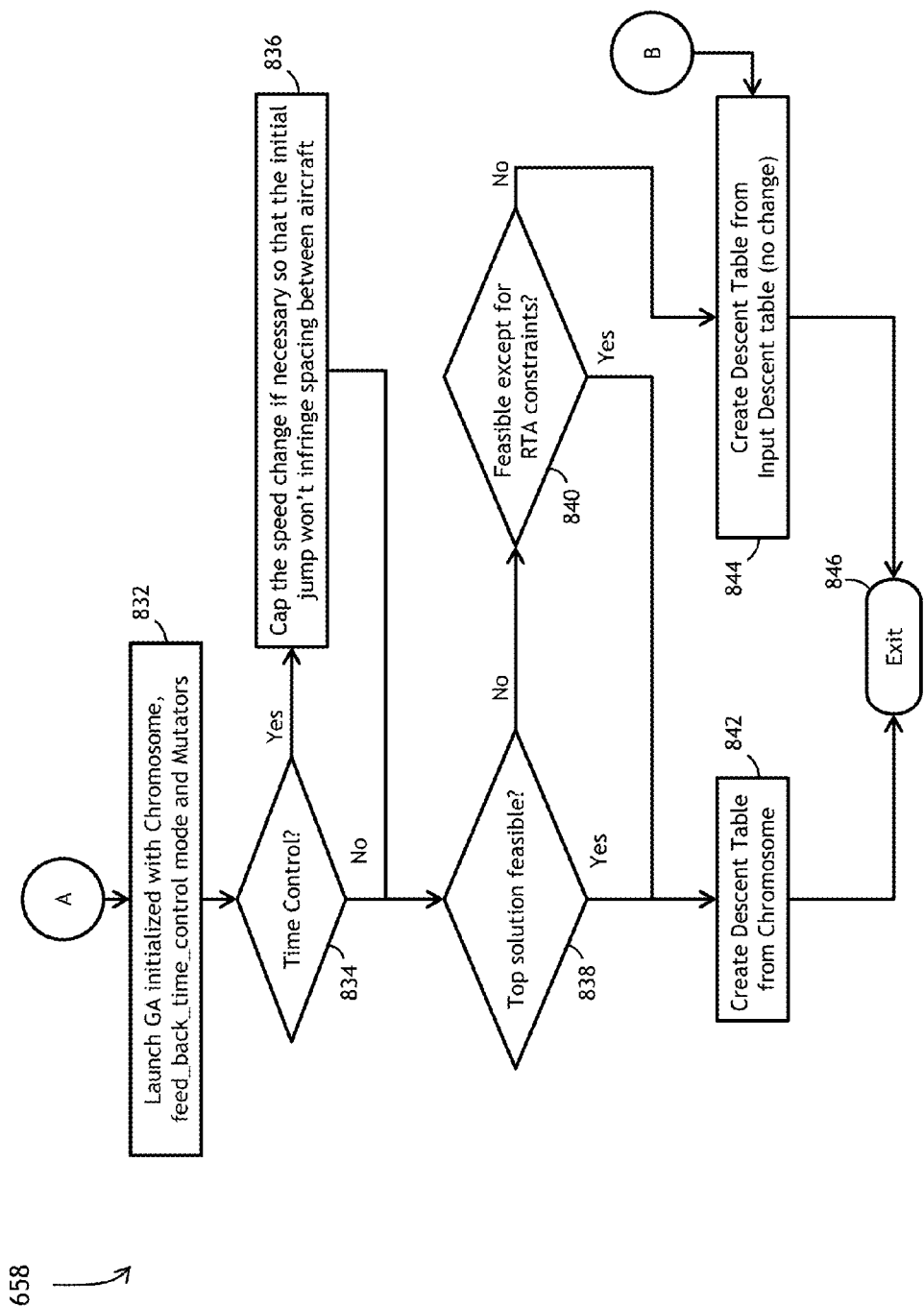

Referring to FIGS. 8A and 8B, a processing diagram for optimal E* driver used by the time controlled 4DFMS in accordance with one embodiment of the inventive concepts disclosed herein is shown. Should the system 100 invoke a trigger 152, the optimal E* driver 658 may include the process 658 to create a new descent table usable by the FMS. As in the '612 application, the system 100 may use one or more of a chromosome based initial reference path candidate. For example, the reference path may serve as the seed path used to generate the initial population of 10 path candidates (i.e., chromosomes) by using the genetic operators. The system 100 may use a uniform probability to select each genetic operator. The reference path (from the step 502) is one of these 10 path candidates in the initial population, $P_0$. Therefore, the system 100 may generate only nine additional new path candidates from the seed path to populate $P_0$. The reference path may be kept in the population for each generation.

At a step 802, the process may calculate the TEE at the next waypoint TEE=ETA from current descent table−ETA from Chromosome. At a step 804, the process may set a DescentPathFree variable to true while the following set of queries may determine a status of DescentPathFree variable based on current aircraft parameters. At a query 806, the process may query if the first aircraft 210 FMS is in the descent mode. If the answer to query 806 is yes, the process moves to a query 808 to determine if TEE estimates a late arrival. If the result of query 806 is negative, the DescentPathFree variable remains set at True and the process moves to a query 816 to determine the status of the DescentPathFree variable. Should the answer to the query 808 be yes, the process moves to an additional query 810 to determine if the descent speed schedule is at maximum and a current path is above a waypoint crossover altitude. However, should the answer to query 808 be negative, the process moves to an additional query 812 to determine if the descent speed is at a minimum.

Should the process 658 find the answer to query 810 is affirmative, the process 658 may set the DescentPathFree variable to False at the step 814 and proceed to the query 816.

However, if the answer to query 810 is negative, the process may directly move to query 816. Similarly, should the process 658 find the answer to query 812 is affirmative, the process 658 may set the DescentPathFree variable to False at the step 814 and proceed to the query 816. However, if the answer to query 812 is negative, the process may directly proceed to query 816.

At a query 816, the process may analyze the DescentPathFree variable to determine if the variable is set to True or False. If the answer to query 816 is true, the process may proceed to an additional query 818 to determine if the system 100 is in a time control mode. If the query 816 result is false, the process may proceed to a step 844 (FIG. 8B) to create the descent table from the input descent table (no change).

The query 818 and subsequent may operate to determine which mutators may be active to replan the new descent table. If the answer to query 818 is negative, the process flows to a step 822 to set the mutators to 1) DescentSPeed, 2) SPeedCrossOver, and 3) FlightPathAngle. However, if the answer to query 818 is affirmative, the process continues to an additional query 820 to determine if the FMS is in the descent mode. If the answer to query 820 is negative, the process 658 may set the mutators to 1) DescentSPeed and 3) FlightPathAngle at a step 830. However, if the answer to query 820 is positive, the process may determine a max and min descent speeds at a step 824, create a speed table at a step 826 and set to mutators to 1) FixedDescentSPeed at a step 828. Once the mutators are set, the process may proceed to a step 832 to launch the DGA initialized with chromosome, feed_back_time_control mode and mutators, then proceed to query 834 to determine if the system 100 has triggered a time control 150. If the answer to query 834 is negative, the process may flow to an additional query 838 to determine of a top solution is feasible. A top solution is the chromosome that requires the least cost and offers the best benefit in the chromosome population. However, should the answer to query 834 is affirmative, the process may cap the speed change if necessary so that the initial speed increase won't infringe a required spacing between aircraft (closure prevention).

Process 658 may determine, at a query 838, if the top solution is feasible. If the answer to query 838 is affirmative, the process may flow to a step 842 of creating the descent table from the chromosome followed by an exit 846. A descent table should at least consist of waypoint locations on the descent trajectory, required airspeed and estimated time of arrival on each descent waypoint. However, if the answer to query 838 is negative, the process may flow to an additional query 840 to determine if the top solution is feasible except for RTA constraints. If the answer to query 840 is affirmative, the process may flow to the step 842. However, should the answer to query 840 be negative, the process may proceed to the step 844 to create the descent table from the input descent table. The process may then proceed to the exit 846.

Figure 9:
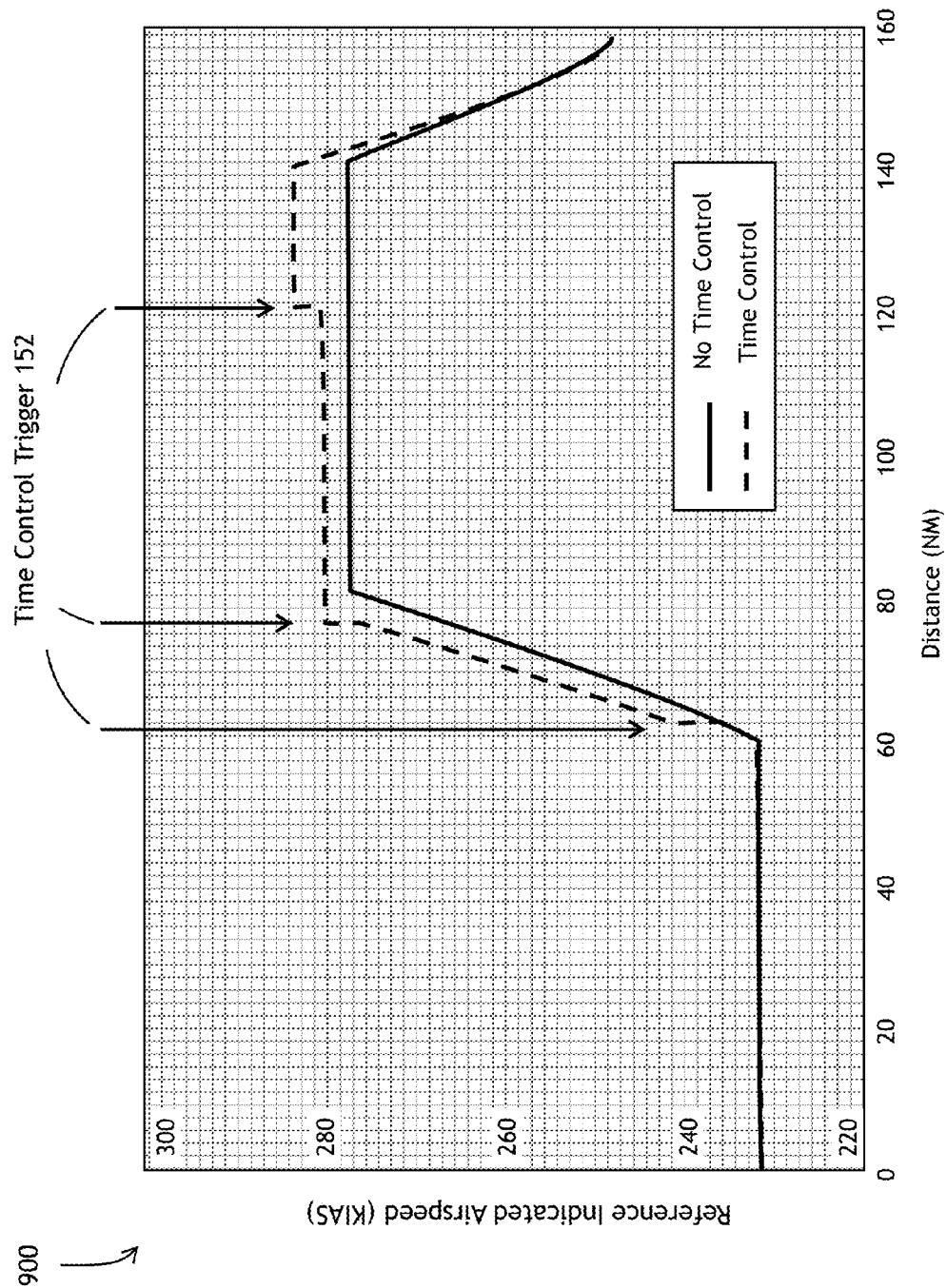
FIG. 9 is a graph of reference airspeed over ground track for time control in accordance with one embodiment of the inventive concepts disclosed herein.

Referring to FIG. 9, a graph of reference airspeed over ground track for time control in accordance with one embodiment of the inventive concepts disclosed herein is shown. The graph 900 may include curves of Indicated Airspeed (IAS) over distance (NM) may indicate the speed of the first aircraft 210 as it follows the path from TOD to the metering waypoint. A first curve within graph 900 may indicate a flight path without the use of the time control embodiments disclosed herein. A second curve however, may indicate the additional CAS increases as a result of the first aircraft 210 encountering a five knot increase in headwind during the descent mode. Graph 900 may indicate an exemplary three trigger 152 events where the system 100 may increase CAS to comply with one or more waypoint requirements. Here, a first trigger at approximately 63 NM from a start point of zero NM may indicate the first aircraft 210 may have experienced a headwind increase different from a forecast. In addition, a trigger at 76 NM may indicate a decrease in a tailwind having a similar effect of a CAS increase to comply with the RTA. Finally, a third trigger 152 may be indicated at 120 NM may indicate a CAS Increase to remain in compliance with the 95% probability of arrival within five seconds of the assigned RTA.

Figure 10:
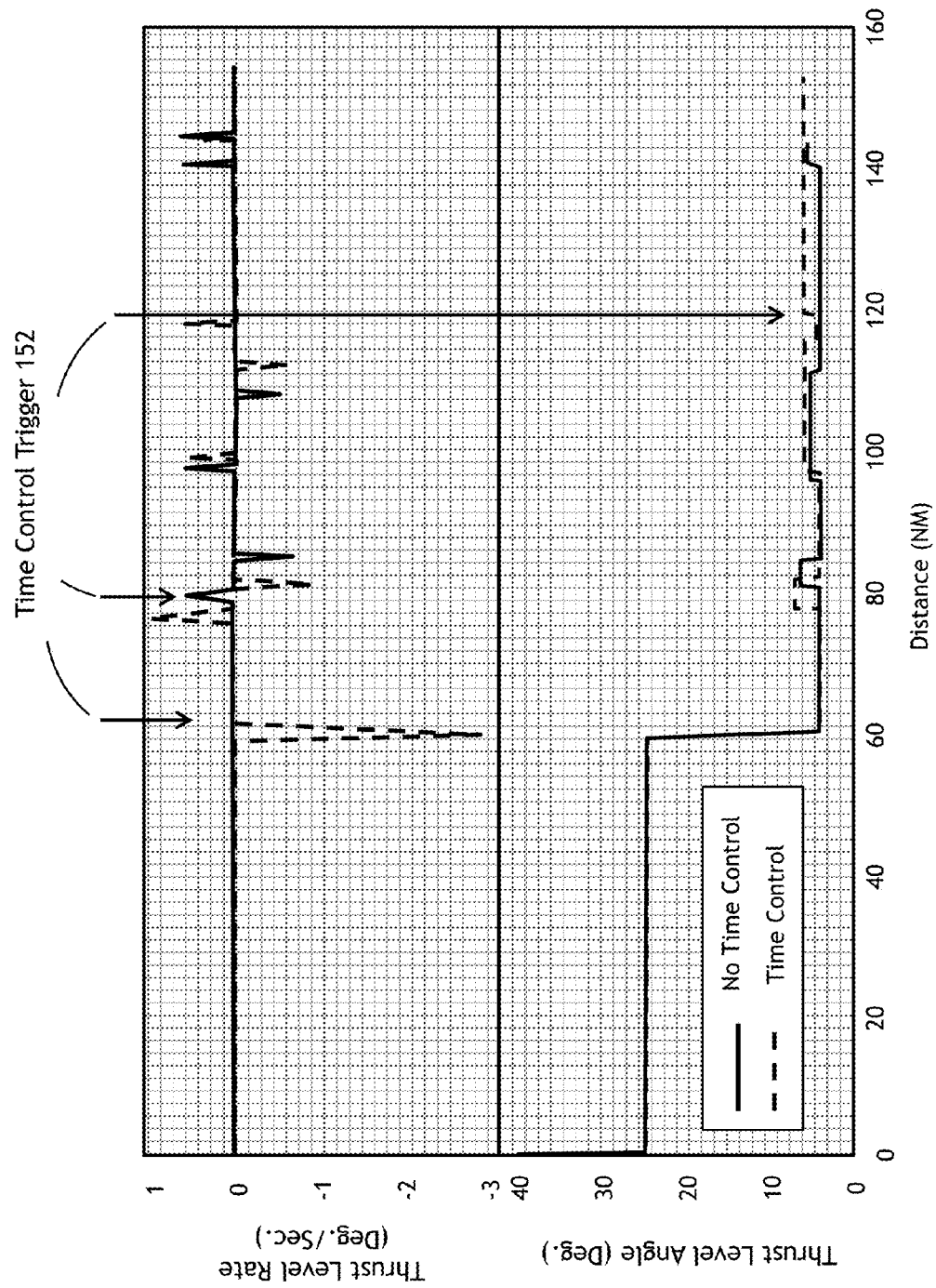
FIG. 10 is a graph of a thrust lever rate and angle over ground track for time control in accordance with one embodiment of the inventive concepts disclosed.

Referring to FIG. 10, a graph of a thrust lever rate and angle over ground track for time control in accordance with one embodiment of the inventive concepts disclosed is shown. With the same trigger events at 63, 76 and 120 NM, the system 100 may command the autoflight system 130 to move the thrust levers to comply with the required RTA. Here, both thrust lever rate of movement as well as thrust lever angle are displayed for a flight path without the benefit of time control 150 as well as with the added benefit of the 4-D FMS with time control 110. As can been seen at the triggers 152, the increase in throttle lever is required to increase CAS in order for the system 100 to comply with the assigned RTA.

Figure 11:
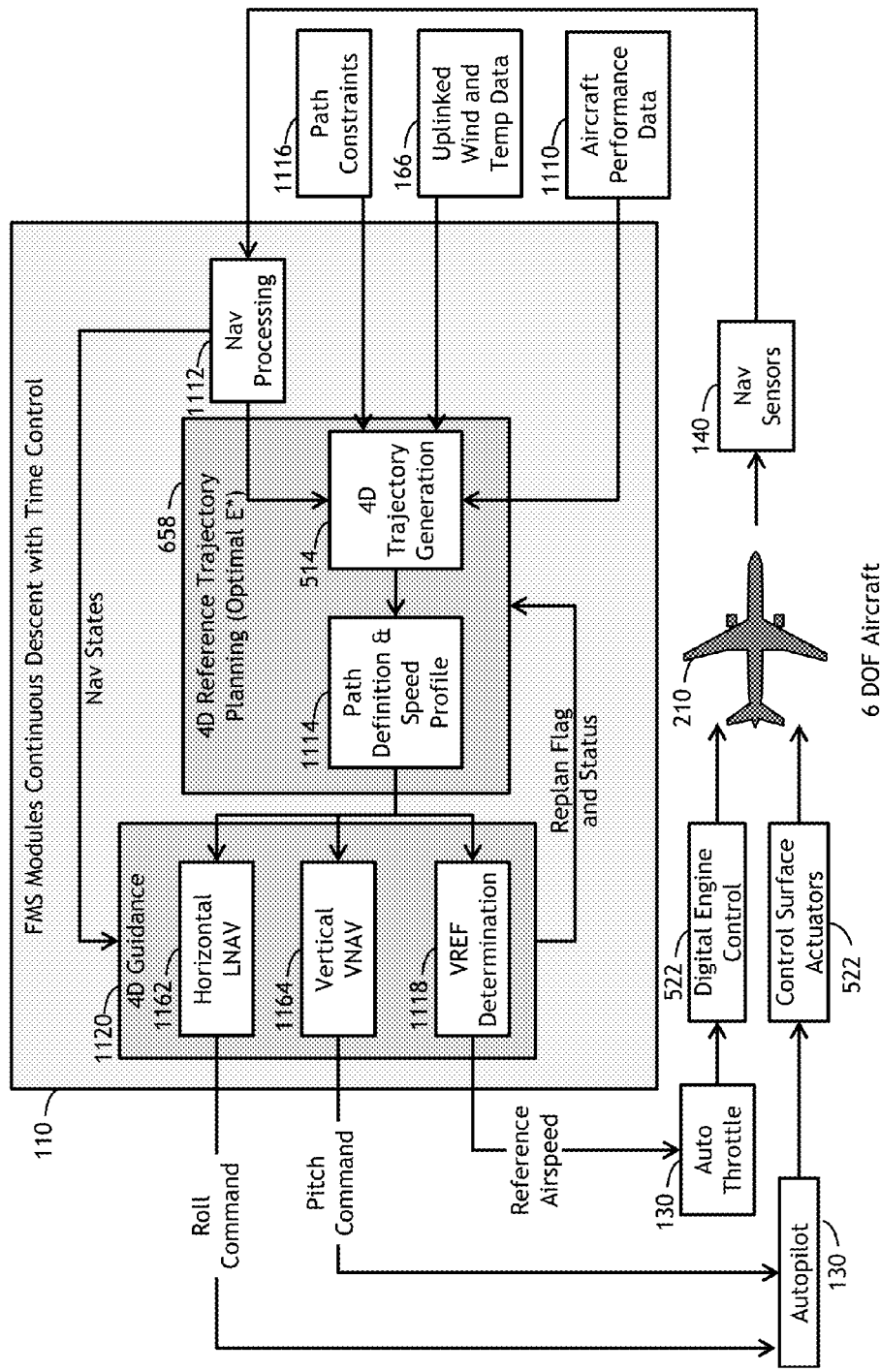
FIG. 11 is a system integration diagram for a 4DFMS with time control in accordance with one embodiment of the inventive concepts disclosed.

Referring to FIG. 11, a system integration diagram for a 4DFMS with time control in accordance with one embodiment of the inventive concepts disclosed is shown. The 4-D FMS with time control 110 may integrate with each of the plurality of aircraft systems to seamlessly provide signals recognizable by current autoflight systems 130 including autothrottle systems and autopilot systems. Once a reference airspeed signal may be received by the autothrottle system, it may command the digital engine control 522 to provide the engines onboard the first aircraft 210 to required throttle position and thrust setting. Similarly, once the autopilot receives the pitch and roll commands it may command control surfaces 522 to maneuver the first aircraft 210 accordingly.

The navigation sensors 140 onboard the first aircraft 210 may operate to supply the navigation processing module 1112 with accurate position, speed and altitude values for accurate 4D guidance 1120 and accurate 4D reference trajectory planning 658. In addition, path constraints 1116, wind and temperature data 166 and aircraft performance data 1110 may provide values to the 4D trajectory generation module 514 for accurate initial planning and replanning. Within the 4D reference trajectory planning 658, a path definition and speed profile module 1114 may operate to generate a required speed for path compliance. Once determined, the path and speed may be provided to the 4D guidance module 1120 to enable accurate horizontal path execution in LNAV 1162, accurate vertical execution in VNAV 1164 and accurate determination of the reference CAS or reference velocity (VREF) 1118.

Figure 12:
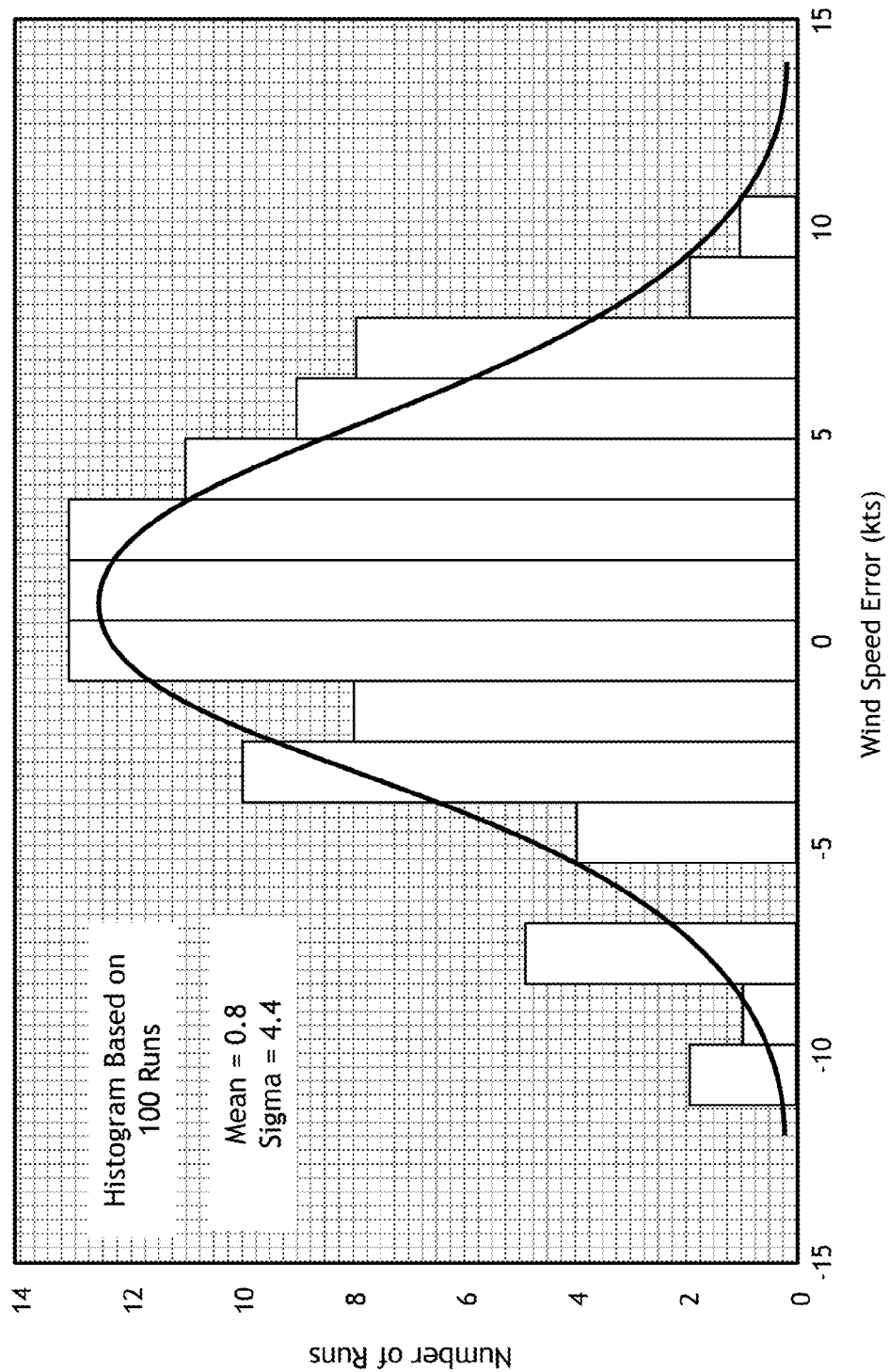
FIG. 12 is a graph of a statistical distribution of wind errors in accordance with one embodiment of the inventive concepts disclosed herein and FIG. 13 is a diagram of an alternate embodiment of the inventive concepts disclosed herein.

Referring to FIG. 12, a graph of a statistical distribution of wind errors in accordance with one embodiment of the inventive concepts disclosed herein is shown. In practice, the 4-D FMS with time control 110 may operate to provide performance similar to test runs. In simulations, a mean wind speed of 20, 15, 15, 10 knots were evaluated at altitudes of 45000, 25000, 15000, 10000 ft MSL. FIG. 12 offers a statistical Gaussian distribution of wind speed errors as $N(0,\sigma)$ with a standard deviation $\sigma=5$ knots in compliance with desired accuracy requirements.

Figure 13:
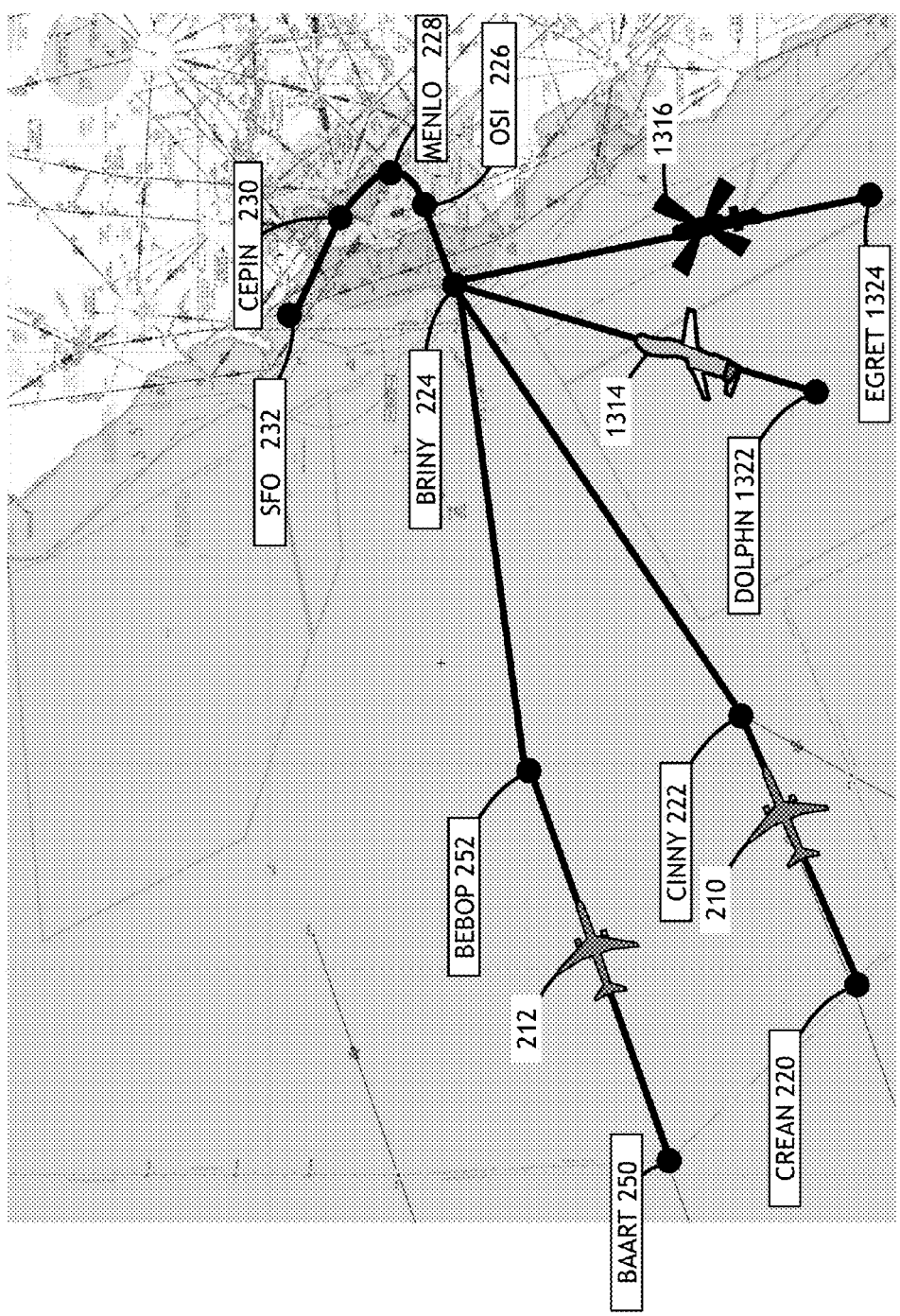

Referring to FIG. 13, a diagram of an alternate embodiment of the inventive concepts disclosed herein is shown. Alternate aircraft may receive enhanced performance from embodiments of the system 100. For example, a Helicopter 1316 and an Unmanned Aerial Vehicle (UAV) 1314 may be fitted with one embodiment of the system 100 to enhance arrival performance as well as merge within the arrival flow of the manned aircraft described above.

CONCLUSION

Noon Specific blocks, sections, devices, functions, processes and modules may have been set forth. However, a skilled technologist will realize that there are many ways to partition the system, and that there are many parts, components, processes, modules or functions that may be substituted for those listed above.

Those having skill in the art will recognize that the state of the art has progressed to the point where there may be little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs.

Additionally, implementations of embodiments disclosed herein may include executing a special-purpose instruction sequence or invoking circuitry for enabling, triggering, coordinating, requesting, or otherwise causing one or more occurrences of virtually any functional operations described herein.

While particular aspects of the inventive concepts disclosed herein have been shown and described, it will be apparent to those skilled in the art that, based upon the teachings herein, changes and modifications may be made without departing from the inventive concepts described herein and their broader aspects and, therefore, the appended claims are to encompass within their scope all such changes and modifications as are within the true spirit and scope of the subject matter described herein.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently.

What is claimed is:

1. A system for four dimensional time controlled flight management, comprising:
   a four dimensional flight management system (4DFMS) onboard an aircraft, the 4DFMS including a flight management computer (FMC) operably coupled with at least a non-transitory memory, a time control module operably coupled with the FMC, an input output device, a display, a route information module, an aircraft information module, and a weather information module;
   the FMC including at least one processor configured for controlling at least a flight control system and an autothrottle system associated with control of the aircraft, the FMC further configured for generating an initial descent path for the aircraft, the initial descent path including at least a top of descent and a reference speed;
   the initial descent path in compliance with an assigned required time of arrival (RTA) at a metering waypoint, a four dimensional published arrival procedure, and an optimized profile descent;
   the time control module configured for:
      receiving sensor data including at least position data, velocity data and altitude data associated with the aircraft;
      receiving weather information associated with the four dimensional published arrival procedure via the weather information module;
      determining a total time error (TTE) at the metering waypoint, the TTE based on the weather information, the assigned RTA at the metering waypoint, an estimated time of arrival (ETA) at the metering waypoint, a planned time of arrival ($ETA_W$) at an active waypoint and an actual time of arrival (ATA) at the active waypoint;
      determining a mode of flight of the aircraft, the mode of flight at least one of a cruise mode and a descent mode;
      triggering a time control replan of the initial descent path, the triggering based on the TTE and the mode of flight, the time control replan in compliance with the assigned RTA at the metering waypoint, the four dimensional published arrival procedure, and the optimized profile descent;
      commanding the FMC to comply with the time control replan;
      commanding the FMC to display the time control replan of the initial descent path to an aircraft crewmember on the display.

2. The system for four dimensional time controlled flight management of claim 1, wherein the initial descent path and the time control replan are both accurate at the metering waypoint to within one of: 95% confidence level of the RTA and six seconds of the RTA.

3. The system for four dimensional time controlled flight management of claim 1, wherein the triggering a time control replan is triggered at a TTE of one of: six seconds when the FMS is in the cruise mode and three seconds when the FMS is in the descent mode.

4. The system for four dimensional time controlled flight management of claim 1, wherein the aircraft is one of: a helicopter, a manned aerial vehicle, and an unmanned aerial vehicle.

5. The system for four dimensional time controlled flight management of claim 1, wherein the time control module is further configured to produce a FMC command recognizable by the FMS, the FMC command further includes at least one of: an airspeed, a power setting, and a rate of descent.

6. The system for four dimensional time controlled flight management of claim 1, wherein the four dimensional published arrival procedure includes at least one of a lateral path, a vertical path, and at least one speed requirement.

7. The system for four dimensional time controlled flight management of claim 1, wherein the weather information further comprises a plurality of wind vectors at a corresponding plurality of altitudes, the plurality of wind vectors updatable via a wireless signal.

8. The system for four dimensional time controlled flight management of claim 1, wherein the FMC continuously calculates the total time error (TTE) at a frequency of one hertz.

9. The system for four dimensional time controlled flight management of claim 1, wherein the initial descent path further includes a descent table including at least two required waypoints and ATA values at the at least two required waypoints.

10. The system for four dimensional time controlled flight management of claim 1, wherein the ETA at the metering waypoint, the $ETA_W$ at the active waypoint and the ATA at the active waypoint are updated using updated weather information.

11. A method for four dimensional time controlled flight management, comprising:

managing a four dimensional flight path of an aircraft via a four dimensional flight management system (4DFMS) onboard the aircraft, the 4DFMS including a flight management computer (FMC) including at least one processor operably coupled with at least a non-transitory memory, a time control module, an input output, a display, a route information module, an aircraft information module, and a weather information module;

generating an initial descent path for the aircraft via the FMC, the initial descent path including at least a top of descent and a reference speed, the initial descent path in compliance with 1) an assigned required time of arrival (RTA) at a metering waypoint, 2) a four dimensional published arrival procedure, and 3) an optimized profile descent;

controlling a flight control system and an autothrottle system onboard the aircraft via the FMC;

receiving sensor data within a time control module operatively connected with the 4DFMS, the sensor data including at least position data, velocity data and altitude data associated with the aircraft;

receiving weather information associated with the four dimensional published arrival procedure via the weather information module;

determining a total time error (TTE) at the metering waypoint, the TTE based on the weather information, the assigned RTA at the metering waypoint, an estimated time of arrival (ETA) at the metering waypoint, a planned time of arrival (ETA$_W$) at an active waypoint and an actual time of arrival (ATA) at the active waypoint;

determining a mode of flight of the aircraft, the mode of flight at least one of a cruise mode and a descent mode;

triggering a time control replan of the initial descent path, the triggering based on the TTE and the mode of flight, the time control replan in compliance with the assigned RTA at the metering waypoint, the four dimensional published arrival procedure, and the optimized profile descent;

commanding the FMC to comply with the time control replan;

displaying the time control replan of the initial descent path to an aircraft crewmember on a display.

12. The method for four dimensional time controlled flight management of claim 11, wherein the initial descent path and the time control replan are both accurate at the metering waypoint to within one of: 95% confidence level of the RTA and six seconds of the RTA.

13. The method for four dimensional time controlled flight management of claim 11, wherein the triggering a time control replan is triggered at a TTE of one of: six seconds when the FMS is in the cruise mode and three seconds when the FMS is in the descent mode.

14. The method for four dimensional time controlled flight management of claim 11, wherein the aircraft is one of: a helicopter, a manned aerial vehicle, and an unmanned aerial vehicle.

15. The method for four dimensional time controlled flight management of claim 11, wherein the time control module is further configured to produce a FMC command recognizable by the FMS, the FMC command further includes at least one of: an airspeed, a power setting, and a rate of descent.

16. The method for four dimensional time controlled flight management of claim 11, wherein the four dimensional published arrival procedure includes at least one of a lateral path, a vertical path, and at least one speed requirement.

17. The method for four dimensional time controlled flight management of claim 11, wherein the weather information further comprises a plurality of wind vectors at a corresponding plurality of altitudes, the plurality of wind vectors updatable via a wireless signal.

18. The method for four dimensional time controlled flight management of claim 11, wherein the FMC continuously calculates the total time error (TTE) at a frequency of one hertz.

19. The method for four dimensional time controlled flight management of claim 11, wherein the initial descent path further includes a descent table including at least two required waypoints and ATA values at the at least two required waypoints.

20. The method for four dimensional time controlled flight management of claim 11, wherein the ETA at the metering waypoint, the ETA at the active waypoint and the ATA at the active waypoint are updated using updated weather information.

* * * * *